US012791353B2

(12) United States Patent
Zhang et al.

(10) Patent No.: US 12,791,353 B2

(45) Date of Patent: Nov. 10, 2026

(54) AI-BASED MACHINE CONTROL

(71) Applicant: NVIDIA Corporation, Santa Clara, CA (US)

(72) Inventors: Yu Zhang, Santa Clara, CA (US); Lin Yang, Santa Clara, CA (US)

(73) Assignee: NVIDIA CORPORATION, Santa Clara, CA (US)

(*) Notice: Subject to any disclaimer, the term of this patent is extended or adjusted under 35 U.S.C. 154(b) by 143 days.

(21) Appl. No.: 18/815,398

(22) Filed: Aug. 26, 2024

(65) Prior Publication Data

US 2024/0418533 A1 Dec. 19, 2024

Related U.S. Application Data

(63) Continuation of application No. 16/919,131, filed on Jul. 2, 2020, now Pat. No. 12,111,177.

(Continued)

(51) Int. Cl.

| | |
|---|---|
| ***G01C 21/00*** | (2006.01) |
| ***G05D 1/00*** | (2006.01) |
| ***G05D 1/246*** | (2024.01) |
| ***G06T 7/73*** | (2017.01) |
| ***G06T 11/20*** | (2006.01) |
| ***G06T 17/00*** | (2006.01) |
| ***G06V 10/764*** | (2022.01) |
| ***G06V 10/82*** | (2022.01) |
| ***G06V 20/56*** | (2022.01) |

(52) U.S. Cl.

CPC ....... *G01C 21/3841* (2020.08); *G05D 1/0274* (2013.01); *G05D 1/246* (2024.01); *G06T 7/75* (2017.01); *G06T 11/20* (2013.01); *G06T 17/00* (2013.01); *G06V 10/764* (2022.01); *G06V 10/82* (2022.01); *G06V 20/56* (2022.01); *G06T 2207/10028* (2013.01); *G06T 2207/20081* (2013.01); *G06T 2207/20084* (2013.01); *G06T 2207/30252* (2013.01)

(58) Field of Classification Search

None

See application file for complete search history.

(56) References Cited

U.S. PATENT DOCUMENTS

| | | | | |
|---|---|---|---|---|
| 9,796,400 B2 * | 10/2017 | Puttagunta | .............. | B61L 25/04 |
| 10,060,751 B1 * | 8/2018 | Chen | ........................ | G06N 7/01 |

(Continued)

FOREIGN PATENT DOCUMENTS

| | | |
|---|---|---|
| WO | 2019/060125 A1 | 3/2019 |
| WO | 2019/094843 A1 | 5/2019 |

OTHER PUBLICATIONS

International Search Report and Written Opinion issued in corresponding application No. PCT/US2020/040791, dated Sep. 18, 2020.

(Continued)

*Primary Examiner* — Jonathan M Dager

(74) *Attorney, Agent, or Firm* — Sanders IP Law

(57) ABSTRACT

Systems and methods related to ground truth data generation using maps and sensor data are disclosed. In some embodiments, a label corresponding to a feature included in a map may be assigned to an image based at least on the feature also being depicted in the image. In these and other embodiments, the labeled image may be used as training data (e.g., ground truth data) for one or more neural networks.

20 Claims, 17 Drawing Sheets

Related U.S. Application Data

(60) Provisional application No. 62/870,923, filed on Jul. 5, 2019.

(56) References Cited

U.S. PATENT DOCUMENTS

| | | | | |
|---|---|---|---|---|
| 10,152,771 | B1 * | 12/2018 | Li | G01S 17/89 |
| 10,437,252 | B1 * | 10/2019 | Liu | G01C 21/1656 |
| 10,657,388 | B2 * | 5/2020 | Patil | G05D 1/0246 |
| 11,204,605 | B1 * | 12/2021 | Allais | B60W 10/06 |
| 11,214,261 | B2 * | 1/2022 | Bluvstein | B60W 40/04 |
| 11,340,079 | B1 * | 5/2022 | Ebrahimi Afrouzi | G01C 21/188 |
| 11,346,682 | B2 * | 5/2022 | Fasola | G01C 21/30 |
| 11,472,442 | B2 * | 10/2022 | Duan | B60W 60/0018 |
| 11,675,083 | B2 * | 6/2023 | Chen | B60W 50/00 701/25 |
| 11,841,434 | B2 * | 12/2023 | Shen | G01S 17/00 |
| 12,020,476 | B2 * | 6/2024 | Iandola | B60W 60/001 |
| 2015/0193986 | A1 | 7/2015 | Nistel | |
| 2016/0070984 | A1 | 3/2016 | Watts | |
| 2018/0058861 | A1 * | 3/2018 | Doria | G01S 7/4808 |
| 2018/0165831 | A1 * | 6/2018 | Kwant | G01C 21/165 |
| 2018/0188039 | A1 * | 7/2018 | Chen | G06T 7/11 |
| 2018/0188041 | A1 * | 7/2018 | Chen | G01C 21/3848 |
| 2018/0188042 | A1 * | 7/2018 | Chen | G06T 17/05 |
| 2018/0267558 | A1 * | 9/2018 | Tiwari | G05D 1/0038 |
| 2018/0275658 | A1 * | 9/2018 | Iandola | B60W 60/001 |
| 2018/0293453 | A1 * | 10/2018 | Viswanathan | G06V 10/40 |
| 2018/0349746 | A1 * | 12/2018 | Vallespi-Gonzalez | G01S 7/4808 |
| 2018/0364717 | A1 * | 12/2018 | Douillard | G01S 17/58 |
| 2018/0373980 | A1 * | 12/2018 | Huval | G01S 17/86 |
| 2019/0120948 | A1 * | 4/2019 | Yang | G01S 7/497 |
| 2019/0156128 | A1 | 5/2019 | Zhang et al. | |
| 2019/0197778 | A1 * | 6/2019 | Sachdeva | G06V 10/7788 |
| 2019/0258251 | A1 * | 8/2019 | Ditty | B60W 60/0015 |
| 2019/0258737 | A1 * | 8/2019 | Wang | G01C 21/3848 |
| 2019/0376809 | A1 * | 12/2019 | Hanniel | G01C 21/3602 |
| 2020/0089973 | A1 * | 3/2020 | Efland | B60W 30/06 |
| 2020/0109954 | A1 * | 4/2020 | Li | G01C 21/3804 |
| 2020/0134372 | A1 * | 4/2020 | Roy Chowdhury | G05D 1/0088 |
| 2020/0134378 | A1 * | 4/2020 | Viswanathan | G05D 1/0088 |
| 2020/0158869 | A1 * | 5/2020 | Amirloo Abolfathi | G01S 7/4808 |
| 2020/0210715 | A1 * | 7/2020 | Golomedov | G05D 1/0248 |
| 2020/0364554 | A1 * | 11/2020 | Wang | G06V 20/56 |
| 2022/0092854 | A1 * | 3/2022 | Nussbaum | G06V 10/82 |
| 2025/0369769 | A1 * | 12/2025 | Rokni | G01C 21/3815 |

OTHER PUBLICATIONS

Kim et al., A New 3D Object Pose Detection Method Using LIDAR Shape Set, Department of Media Engineering, University of Korea, Mar. 16, 2016.

Zhang et al., "Curriculum Domain Adaptation for Semantic Segmentation of Urban Scenes", arXiv preprint arXiv: 1608.07916 (Year: 2016).

* cited by examiner

AI-BASED MACHINE CONTROL

CROSS-REFERENCE TO A RELATED APPLICATION

This patent application claims priority to U.S. application Ser. No. 16/919,131, filed Jul. 2, 2020, which claims benefit of U.S. Provisional App. No. 62/870,923, filed Jul. 5, 2019, the disclosures of each of which are hereby incorporated herein by this reference in their entireties.

FIELD

The embodiments discussed herein are related to maps for autonomous vehicles, and more particularly to generating training data for training deep learning models used for building high definition maps for autonomous vehicles.

BACKGROUND

Autonomous vehicles, also known as self-driving cars, driverless cars, or robotic cars, may drive from a source location to a destination location without requiring a human driver to control or navigate the vehicle. Automation of driving may be difficult for several reasons. For example, autonomous vehicles may use sensors to make driving decisions on the fly, or with little response time, but vehicle sensors may not be able to observe or detect some or all inputs that may be required or useful to safely control or navigate the vehicle safely in some instances. Vehicle sensors may be obscured by corners, rolling hills, other vehicles, etc. Vehicles sensors may not observe certain inputs early enough to make decisions that may be necessary to operate the vehicle safely or to reach a desired destination. In addition, some inputs, such as lanes, road signs, or traffic signals, may be missing on the road, may be obscured from view, or may not be readily visible, and therefore may not be detectable by sensors. Furthermore, vehicle sensors may have difficulty detecting emergency vehicles, a stopped obstacle in a given lane of traffic, or road signs for rights of way.

Autonomous vehicles may use map data to discover some of the above information rather than relying on sensor data. However, conventional maps have several drawbacks that may make them difficult to use for an autonomous vehicle. For example, conventional maps may not provide the level of precision or accuracy that for navigation within a certain safety threshold (e.g., accuracy within 30 centimeters (cm) or better). Further, GPS systems may provide accuracies of approximately 3-5 meters (m) but have large error conditions that may result in accuracies of over 100 m. This lack of accuracy may make it challenging to accurately determine the location of the vehicle on a map or to identify (e.g., using a map, even a highly precise and accurate one) a vehicle's surroundings at the level of precision and accuracy desired.

Furthermore, conventional maps may be created by survey teams that may use drivers with specially outfitted survey cars with high resolution sensors that may drive around a geographic region and take measurements. The measurements may be provided to a team of map editors that may assemble one or more maps from the measurements. This process may be expensive and time consuming (e.g., taking weeks to months to create a comprehensive map). As a result, maps assembled using such techniques may not have fresh data. For example, roads may be updated or modified on a much more frequent basis (e.g., rate of roughly 5-10% per year) than a survey team may survey a given area. For example, survey cars may be expensive and limited in number, making it difficult to capture many of these updates or modifications. For example, a survey fleet may include a thousand survey cars. Due to the large number of roads and the drivable distance in any given state in the United States, a survey fleet of a thousand cars may not cover the same area at the same frequency of road changes to keep the map up to date on a regular basis and to facilitate safe self-driving of autonomous vehicles. As a result, conventional techniques of maintaining maps may be unable to provide data that is sufficiently accurate and up to date for the safe navigation of autonomous vehicles.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, operations may comprise receiving sensor data from one or more vehicles. The operations may also comprise determining, by combining the received sensor data, a high definition map comprising a point cloud. The operations may also comprise labeling one or more objects in the point cloud, each of the one or more objects represented as a set of points from the point cloud. The operations may also comprise generating training data by receiving a new image captured by one of the vehicles, receiving a pose of the vehicle when the new image was captured, determining an object having a label in the point cloud that is observable from the pose of the vehicle, determining a position of the object in the new image, and labeling the new image by assigning the label of the object to the new image, the labeled new image comprising the training data. The operations may also comprise training a deep learning model using the training data.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Overview

Figure 1:
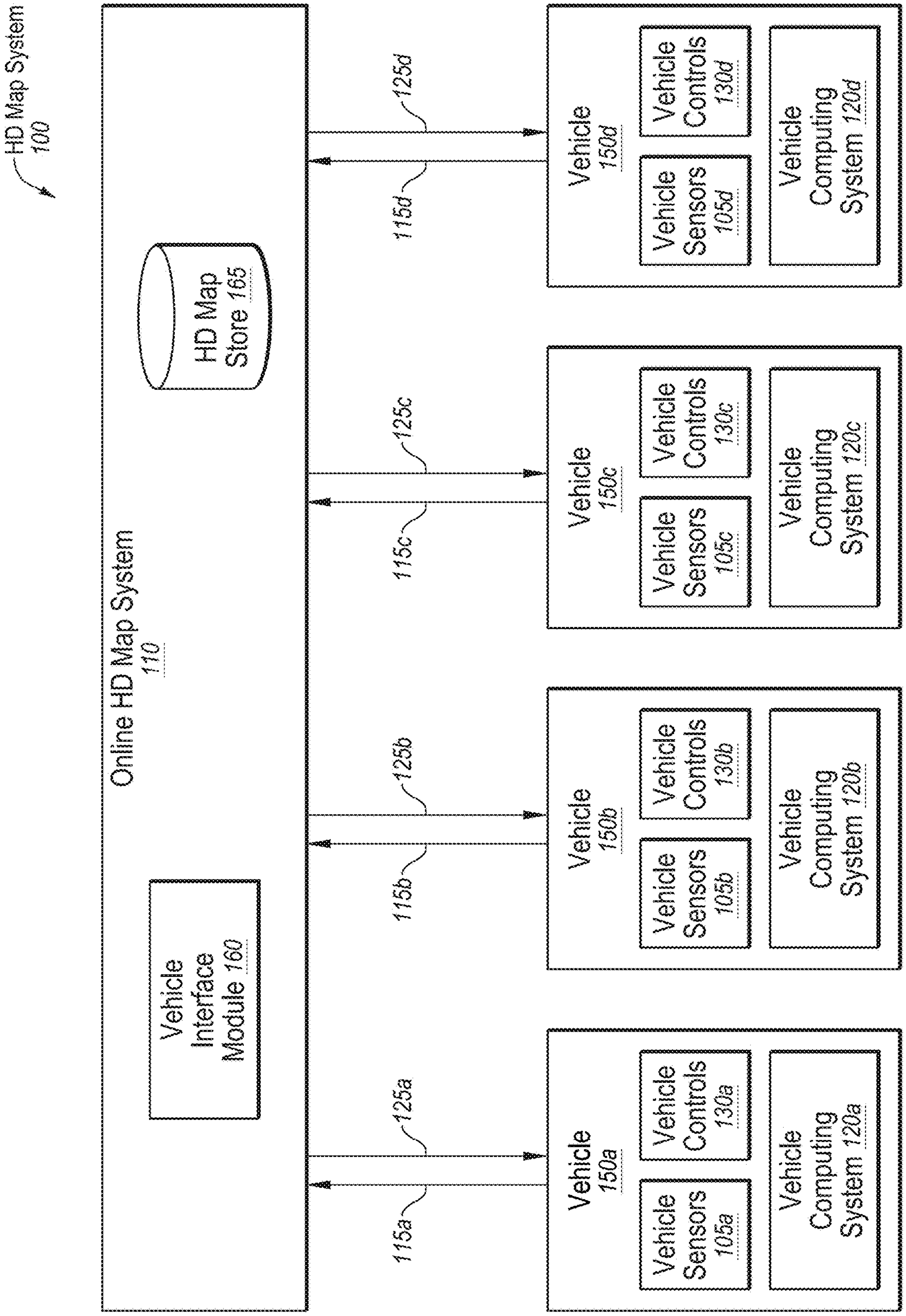
FIG. 1 illustrates an example overall system environment of an HD map system interacting with multiple vehicle computing systems.

Embodiments of the present disclosure may maintain high definition (HD) maps that may include up-to-date information with high accuracy or precision. The HD maps may be used by an autonomous vehicle to safely navigate to various destinations without human input or with limited human input. In the present disclosure reference to "safe navigation" may refer to performance of navigation within a target safety threshold. For example, the target safety threshold may be a certain number of driving hours without an accident. Such thresholds may be set by automotive manufacturers or government agencies. Additionally, reference to "up-to-date" information does not necessarily mean absolutely up-to-date, but up-to-date within a target threshold amount of time. For example, a target threshold amount of time may be one week or less such that a map that reflects any potential changes to a roadway that may have occurred within the past week may be considered "up-to-date". Such target threshold amounts of time may vary anywhere from one month to 1 minute, or possibly even less.

The autonomous vehicle may be a vehicle capable of sensing its environment and navigating without human input. An HD map may refer to a map that may store data with high precision and accuracy, for example, with accuracies of approximately 2-30 cm.

Some embodiments may generate HD maps that may contain spatial geometric information about the roads on which the autonomous vehicle may travel. Accordingly, the generated HD maps may include the information that may allow the autonomous vehicle to navigate safely without human intervention. Some embodiments may gather and use data from the lower resolution sensors of the self-driving vehicle itself as it drives around rather than relying on data that may be collected by an expensive and time-consuming mapping fleet process that may include a fleet of vehicles outfitted with high resolution sensors to create HD maps. The autonomous vehicles may have no prior map data for these routes or even for the region. Some embodiments may provide location as a service (LaaS) such that autonomous vehicles of different manufacturers may gain access to the most up-to-date map information collected, obtained, or created via the aforementioned processes.

Some embodiments may generate and maintain HD maps that may be accurate and may include up-to-date road conditions for safe navigation of the autonomous vehicle. For example, the HD maps may provide the current location of the autonomous vehicle relative to one or more lanes of roads precisely enough to allow the autonomous vehicle to drive safely in and to maneuver safety between one or more lanes of the roads.

HD maps may store a very large amount of information, and therefore may present challenges in the management of the information. For example, an HD map for a given geographic region may be too large to store on a local storage of the autonomous vehicle. Some embodiments may provide a portion of an HD map to the autonomous vehicle that may allow the autonomous vehicle to determine its current location in the HD map, determine the features on the road relative to the autonomous vehicle's position, determine if it is safe to move the autonomous vehicle based on physical constraints and legal constraints, etc. Examples of such physical constraints may include physical obstacles, such as walls, barriers, medians, curbs, etc. and examples of legal constraints may include an allowed direction of travel for a lane, lane restrictions, speed limits, yields, stops, following distances, etc.

Some embodiments of the present disclosure may allow safe navigation for an autonomous vehicle by providing relatively low latency, for example, 5-40 milliseconds or less, for providing a response to a request; high accuracy in terms of location, for example, accuracy within 30 cm or better; freshness of data such that a map may be updated to reflect changes on the road within a threshold time frame, for example, within days, hours, minutes or seconds; and storage efficiency by reducing or minimizing the storage used by the HD Map.

Some embodiments of the present disclosure may involve generating training data for training deep learning models used for building high definition maps for autonomous vehicles. For example, a system may receive sensor data from one or more autonomous vehicles and may then generate an HD map comprising a point cloud by combining the received sensor data. The system may also label objects in the point cloud. The system may then employ the labeled objects as training data in the training of a deep learning model. The deep learning model may then be used for various tasks such as, for example, perception, recognizing objects in images, image segmentation, etc.

Embodiments of the present disclosure are explained with reference to the accompanying drawings.

System Environment of HD Map System

FIG. 1 illustrates an example overall system environment of an HD map system 100 that may interact with multiple vehicles, according to one or more embodiments of the present disclosure. The HD map system 100 may comprise an online HD map system 110 that may interact with a plurality of vehicles 150 (e.g., vehicles 150*a-d*) of the HD map system 100. The vehicles 150 may be autonomous vehicles or non-autonomous vehicles.

The online HD map system 110 may be configured to receive sensor data that may be captured by sensors of the vehicles 150 and combine data received from the vehicles 150 to generate and maintain HD maps. The online HD map system 110 may be configured to send HD map data to the vehicles 150 for use in driving the vehicles 150. In some embodiments, the online HD map system 110 may be implemented as a distributed computing system, for example, a cloud-based service that may allow clients such as a vehicle computing system 120 (e.g., vehicle computing systems 120*a-d*) to make requests for information and services. For example, a vehicle computing system 120 may make a request for HD map data for driving along a route and the online HD map system 110 may provide the requested HD map data to the vehicle computing system 120.

FIG. 1 and the other figures use like reference numerals to identify like elements. A letter after a reference numeral, such as "105A," indicates that the text refers specifically to the element having that particular reference numeral. A reference numeral in the text without a following letter, such as "105," refers to any or all of the elements in the figures bearing that reference numeral (e.g. "105" in the text refers to reference numerals "105A" and/or "105N" in the figures).

Figure 4:
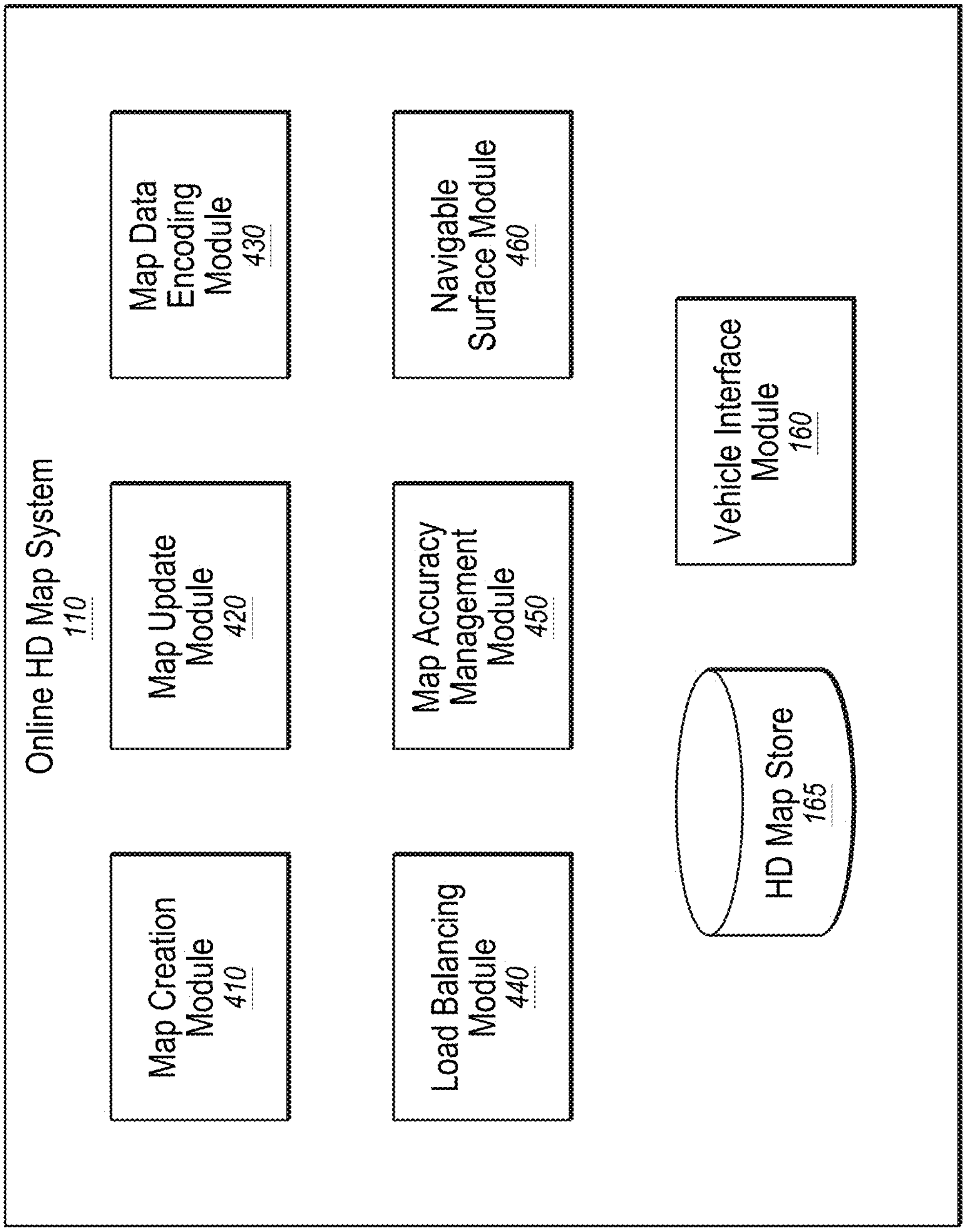
FIG. 4 illustrates an example of system architecture of an online HD map system.

The online HD map system 110 may comprise a vehicle interface module 160 and an HD map store 165. The online HD map system 110 may be configured to interact with the vehicle computing system 120 of various vehicles 150 using the vehicle interface module 160. The online HD map system 110 may be configured to store map information for various geographical regions in the HD map store 165. The online HD map system 110 may be configured to include other modules than those illustrated in FIG. 1, for example, various other modules as illustrated in FIG. 4 and further described herein.

In the present disclosure, a module may include code and routines configured to enable a corresponding system (e.g., a corresponding computing system) to perform one or more of the operations described therewith. Additionally or alternatively, any given module may be implemented using hardware including any number of processors, microprocessors (e.g., to perform or control performance of one or more operations), field-programmable gate arrays (FPGAs), application-specific integrated circuits (ASICs) or any suitable combination of two or more thereof. Alternatively or additionally, any given module may be implemented using a combination of hardware and software. In the present disclosure, operations described as being performed by a module may include operations that the module may direct a corresponding system to perform.

Further, the differentiation and separation of different modules indicated in the present disclosure is to help with explanation of operations being performed and is not meant to be limiting. For example, depending on the implementation, the operations described with respect to two or more of the modules described in the present disclosure may be performed by what may be considered as a same module. Further, the operations of one or more of the modules may be divided among what may be considered one or more other modules or submodules depending on the implementation.

The online HD map system 110 may be configured to receive sensor data collected by sensors of a plurality of vehicles 150, for example, hundreds or thousands of cars. The sensor data may include any data that may be obtained by sensors of the vehicles that may be related to generation of HD maps. For example, the sensor data may include LIDAR data, captured images, etc. Additionally or alternatively, the sensor data may include information that may describe the current state of the vehicle 150, the location and motion parameters of the vehicles 150, etc.

The vehicles 150 may be configured to provide the sensor data 115 that may be captured while driving along various routes and to send it to the online HD map system 110. The online HD map system 110 may be configured to use the sensor data 115 received from the vehicles 150 to create and update HD maps describing the regions in which the vehicles 150 may be driving. The online HD map system 110 may be configured to build high definition maps based on the collective sensor data 115 that may be received from the vehicles 150 and to store the HD map information in the HD map store 165.

The online HD map system 110 may be configured to send HD map data to the vehicles 150 at the request of the vehicles 150.

For example, in instances in which a particular vehicle 150 is scheduled to drive along a route, the particular vehicle computing system 120 of the particular vehicle 150 may be configured to provide information describing the route being travelled to the online HD map system 110. In response, the online HD map system 110 may be configured to provide HD map data of HD maps related to the route (e.g., that represent the area that includes the route) that may facilitate navigation and driving along the route by the particular vehicle 150.

In an embodiment, the online HD map system 110 may be configured to send portions of the HD map data to the vehicles 150 in a compressed format so that the data transmitted may consume less bandwidth. The online HD map system 110 may be configured to receive from various vehicles 150, information describing the HD map data that may be stored at a local HD map store (e.g., the local HD map store 275 of FIG. 2) of the vehicles 150.

In some embodiments, the online HD map system 110 may determine that the particular vehicle 150 may not have certain portions of the HD map data stored locally in a local HD map store of the particular vehicle computing system 120 of the particular vehicle 150. In these or other embodiments, in response to such a determination, the online HD map system 110 may be configured to send a particular portion of the HD map data to the vehicle 150.

In some embodiments, the online HD map system 110 may determine that the particular vehicle 150 may have previously received HD map data with respect to the same geographic area as the particular portion of the HD map data. In these or other embodiments, the online HD map system 110 may determine that the particular portion of the HD map data may be an updated version of the previously received HD map data that was updated by the online HD map system 110 since the particular vehicle 150 last received the previous HD map data. In some embodiments, the online HD map system 110 may send an update for that portion of the HD map data that may be stored at the particular vehicle 150. This may allow the online HD map system 110 to reduce or minimize the amount of HD map data that may be communicated with the vehicle 150 and also to keep the HD map data stored locally in the vehicle updated on a regular basis.

The vehicle 150 may include vehicle sensors 105 (e.g., vehicle sensors 105*a-d*), vehicle controls 130 (e.g., vehicle controls 130*a-d*), and a vehicle computing system 120 (e.g., vehicle computer systems 120*a-d*). The vehicle sensors 105 may be configured to detect the surroundings of the vehicle 150. In these or other embodiments, the vehicle sensors 105 may detect information describing the current state of the vehicle 150, for example, information describing the location and motion parameters of the vehicle 150.

The vehicle sensors 105 may comprise a camera, a light detection and ranging sensor (LIDAR), a global navigation satellite system (GNSS) receiver, for example, a global positioning system (GPS) navigation system, an inertial measurement unit (IMU), and others. The vehicle sensors 105 may include one or more cameras that may capture images of the surroundings of the vehicle. A LIDAR may survey the surroundings of the vehicle by measuring distance to a target by illuminating that target with a laser light pulses and measuring the reflected pulses. The GPS navigation system may determine the position of the vehicle 150 based on signals from satellites. The IMU may include an electronic device that may be configured to measure and report motion data of the vehicle 150 such as velocity, acceleration, direction of movement, speed, angular rate, and so on using a combination of accelerometers and gyroscopes or other measuring instruments.

The vehicle controls 130 may be configured to control the physical movement of the vehicle 150, for example, acceleration, direction change, starting, stopping, etc. The vehicle controls 130 may include the machinery for controlling the accelerator, brakes, steering wheel, etc. The vehicle computing system 120 may provide control signals to the vehicle controls 130 on a regular and/or continuous basis and may cause the vehicle 150 to drive along a selected route.

The vehicle computing system 120 may be configured to perform various tasks including processing data collected by the sensors as well as map data received from the online HD map system 110. The vehicle computing system 120 may also be configured to process data for sending to the online HD map system 110. An example of the vehicle computing system 120 is further illustrated in FIG. 2 and further described in connection with FIG. 2.

The interactions between the vehicle computing systems 120 and the online HD map system 110 may be performed via a network, for example, via the Internet. The network may be configured to enable communications between the vehicle computing systems 120 and the online HD map system 110. In some embodiments, the network may be configured to utilize standard communications technologies and/or protocols. The data exchanged over the network may be represented using technologies and/or formats including the hypertext markup language (HTML), the extensible markup language (XML), etc. In addition, all or some of links may be encrypted using conventional encryption technologies such as secure sockets layer (SSL), transport layer security (TLS), virtual private networks (VPNs), Internet Protocol security (IPsec), etc. In some embodiments, the entities may use custom and/or dedicated data communications technologies.

Vehicle Computing System

Figure 2:
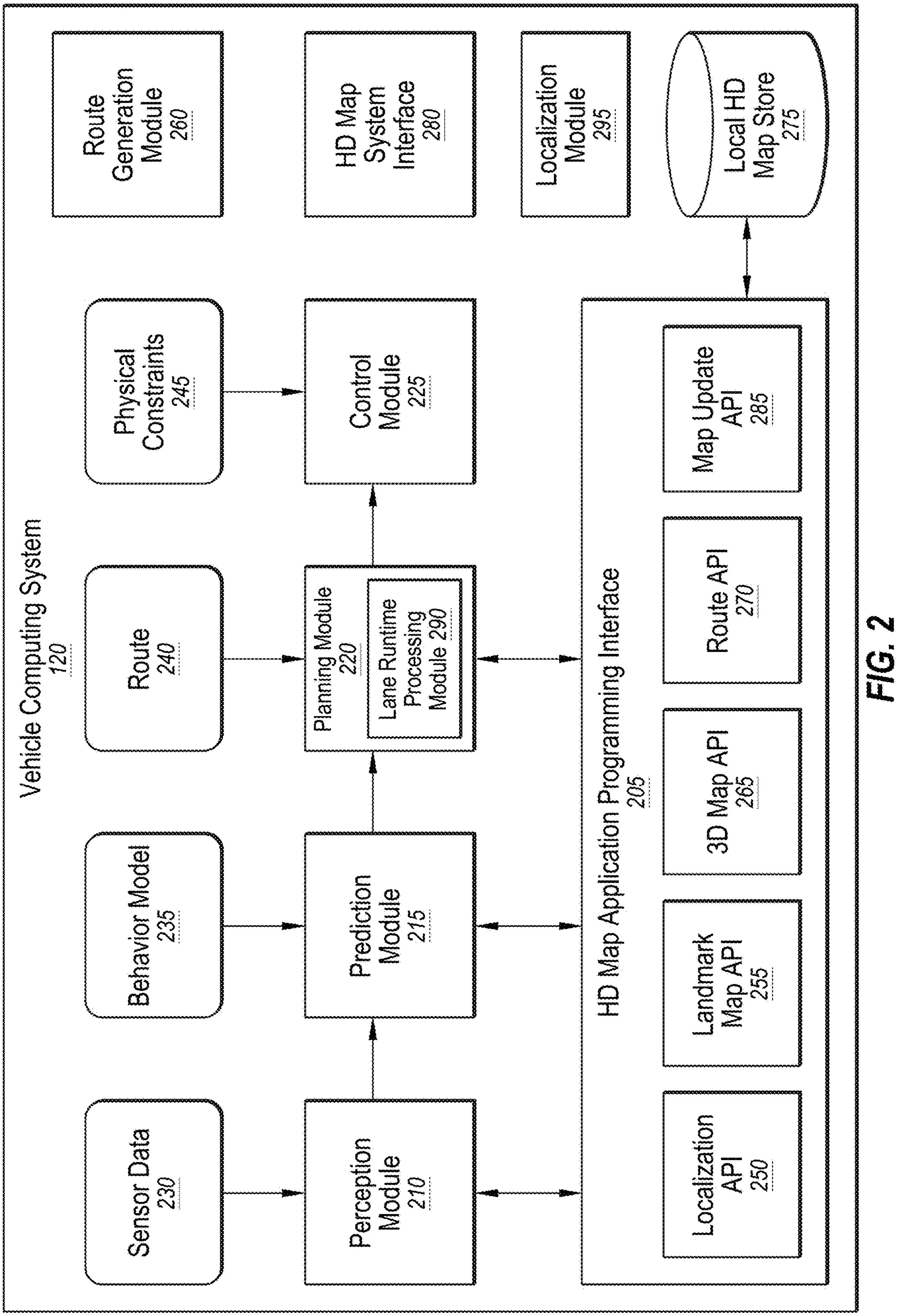
FIG. 2 illustrates an example system architecture of a vehicle computing system.

FIG. 2 illustrates an example system architecture of the vehicle computing system 120. The vehicle computing system 120 may include a perception module 210, a prediction module 215, a planning module 220 that may include a lane runtime processing module 290, a control module 225, a localization module 295, a local HD map store 275, an HD map system interface 280, and an HD map application programming interface (API) 205. The various modules of the vehicle computing system 120 may be configured to process various types of data including sensor data 230, a behavior model 235, routes 240, and physical constraints 245. In some embodiments, the vehicle computing system 120 may contain more or fewer modules. The functionality described as being implemented by a particular module may be implemented by other modules.

With reference to FIG. 2 and FIG. 1, in some embodiments, the vehicle computing system 120 may include a perception module 210. The perception module 210 may be configured to receive sensor data 230 from the vehicle sensors 105 of the vehicles 150. The sensor data 230 may include data collected by cameras of the car, LIDAR, IMU, GPS navigation system, etc. The perception module 210 may also be configured to use the sensor data 230 to determine what objects are around the corresponding vehicle 150, the details of the road on which the corresponding vehicle 150 is travelling, etc. In addition, the perception module 210 may be configured to process the sensor data 230 to populate data structures storing the sensor data 230 and to provide the information or instructions to a prediction module 215 of the vehicle computing system 120.

The prediction module 215 may be configured to interpret the data provided by the perception module 210 using behavior models of the objects perceived to determine whether an object may be moving or likely to move. For example, the prediction module 215 may determine that objects representing road signs may not be likely to move, whereas objects identified as vehicles, people, etc., may either be in motion or likely to move. The prediction module 215 may also be configured to use behavior models 235 of various types of objects to determine whether they may be likely to move. In addition, the prediction module 215 may also be configured to provide the predictions of various objects to a planning module 200 of the vehicle computing system 120 to plan the subsequent actions that the corresponding vehicle 150 may take next.

The planning module 200 may be configured to receive information describing the surroundings of the corresponding vehicle 150 from the prediction module 215 and a route 240 that may indicate a destination of the vehicle 150 and that may indicate the path that the vehicle 150 may take to get to the destination.

The planning module 200 may also be configured to use the information from the prediction module 215 and the route 240 to plan a sequence of actions that the vehicle 150 may to take within a short time interval, for example, within the next few seconds. In some embodiments, the planning module 200 may be configured to specify a sequence of actions as one or more points representing nearby locations that the corresponding vehicle 150 may drive through next. The planning module 200 may be configured to provide, to the control module 225, the details of a plan comprising the sequence of actions to be taken by the corresponding vehicle 150. The plan may indicate the subsequent action or actions of the corresponding vehicle 150, for example, whether the corresponding vehicle 150 may perform a lane change, a turn, an acceleration by increasing the speed or slowing down, etc.

The control module 225 may be configured to determine the control signals that may be sent to the vehicle controls 130 of the corresponding vehicle 150 based on the plan that may be received from the planning module 200. For example, if the corresponding vehicle 150 is currently at point A and the plan specifies that the corresponding vehicle 150 should next proceed to a nearby point B, the control module 225 may determine the control signals for the vehicle controls 130 that may cause the corresponding vehicle 150 to go from point A to point B in a safe and smooth way, for example, without taking any sharp turns or a zig zag path from point A to point B. The path that may be taken by the corresponding vehicle 150 to go from point A to point B may depend on the current speed and direction of the corresponding vehicle 150 as well as the location of point B with respect to point A. For example, if the current speed of the corresponding vehicle 150 is high, the corresponding vehicle 150 may take a wider turn compared to another vehicle driving slowly.

The control module 225 may also be configured to receive physical constraints 245 as input. The physical constraints 245 may include the physical capabilities of the corresponding vehicle 150. For example, the corresponding vehicle 150 having a particular make and model may be able to safely make certain types of vehicle movements such as acceleration and turns that another vehicle with a different make and model may not be able to make safely. In addition, the control module 225 may be configured to incorporate the physical constraints 245 in determining the control signals for the vehicle controls 130 of the corresponding vehicle 150. In addition, the control module 225 may be configured to send control signals to the vehicle controls 130 that may cause the corresponding vehicle 150 to execute the specified sequence of actions and may cause the corresponding vehicle 150 to move according to a predetermined set of actions. In some embodiments, the aforementioned steps may be constantly repeated every few seconds and may cause the corresponding vehicle 150 to drive safely along the route that may have been planned for the corresponding vehicle 150.

The various modules of the vehicle computing system 120 including the perception module 210, prediction module 215, and planning module 220 may be configured to receive map information to perform their respective computations. The corresponding vehicle 150 may store the HD map data in the local HD map store 275. The modules of the vehicle computing system 120 may interact with the map data using an HD map API 205.

The HD map API 205 may provide one or more application programming interfaces (APIs) that can be invoked by a module for accessing the map information. The HD map system interface 280 may be configured to allow the vehicle computing system 120 to interact with the online HD map system 110 via a network (not illustrated in the Figures). The local HD map store 275 may store map data in a format that may be specified by the online HD map system 110. The HD map API 205 may be configured to process the map data format as provided by the online HD map system 110. The HD map API 205 may be configured to provide the vehicle computing system 120 with an interface for interacting with the HD map data. The HD map API 205 may include several APIs including a localization API 250, a landmark map API 255, a 3D map API 265, a route API 270, a map update API 285, etc.

The localization API 250 may be configured to determine the current location of the corresponding vehicle 150, for example, where the corresponding vehicle 150 is with respect to a given route. The localization API 250 may be configured to include a localized API that determines a location of the corresponding vehicle 150 within an HD map and within a particular degree of accuracy. The vehicle computing system 120 may also be configured to use the location as an accurate (e.g., within a certain level of accuracy) relative position for making other queries, for example, feature queries, navigable space queries, and occupancy map queries further described herein.

The localization API 250 may be configured to receive inputs comprising one or more of, location provided by GPS, vehicle motion data provided by IMU, LIDAR scanner data, camera images, etc. The localization API 250 may be configured to return an accurate location of the corresponding vehicle 150 as latitude and longitude coordinates. The coordinates that may be returned by the localization API 250 may be more accurate compared to the GPS coordinates used as input, for example, the output of the localization API 250 may have precision ranging within from 2-30 cm. In some embodiments, the vehicle computing system 120 may be configured to invoke the localization API 250 to determine the location of the corresponding vehicle 150 periodically based on the LIDAR using scanner data, for example, at a frequency of 10 Hertz (Hz).

The vehicle computing system 120 may also be configured to invoke the localization API 250 to determine the vehicle location at a higher rate (e.g., 60 Hz) if GPS or IMU data is available at that rate. In addition, vehicle computing system 120 may be configured to store as internal state, location history records to improve accuracy of subsequent localization calls. The location history record may store history of location from the point-in-time, when the corresponding vehicle 150 was turned off/stopped, etc. The localization API 250 may include a localize-route API that may be configured to generate an accurate (e.g., within a specified degree of accuracy) route specifying lanes based on the HD maps. The localize-route API may be configured to receive as input a route from a source to a destination via one or more third-party maps and may be configured to generate a high precision (e.g., within a specified degree of precision such as within 30 cm) route represented as a connected graph of navigable lanes along the input routes based on HD maps.

The landmark map API 255 may be configured to provide a geometric and semantic description of the world around the corresponding vehicle 150, for example, description of various portions of lanes that the corresponding vehicle 150 is currently travelling on. The landmark map APIs 255 comprise APIs that may be configured to allow queries based on landmark maps, for example, fetch-lanes API and fetch-features API. The fetch-lanes API may be configured to provide lane information relative to the corresponding vehicle 150 and the fetch-features API. The fetch-lanes API may also be configured to receive, as input, a location, for example, the location of the corresponding vehicle 150 specified using latitude and longitude and return lane information relative to the input location. In addition, the fetch-lanes API may be configured to specify a distance parameter indicating the distance relative to the input location for which the lane information may be retrieved. Further, the fetch-features API may be configured to receive information identifying one or more lane elements and to return landmark features relative to the specified lane elements. The landmark features may include, for each landmark, a spatial description that may be specific to the type of landmark.

The 3D map API 265 may be configured to provide access to the spatial 3-dimensional (3D) representation of the road and various physical objects around the road as stored in the local HD map store 275. The 3D map APIs 265 may include a fetch-navigable-surfaces API and a fetch-occupancy-grid API. The fetch-navigable-surfaces API may be configured to receive as input identifiers for one or more lane elements and return navigable boundaries for the specified lane elements. The fetch-occupancy-grid API may also be configured to receive a location as input, for example, a latitude and a longitude of the corresponding vehicle 150, and return information describing occupancy for the surface of the road and all objects available in the HD map near the location. The information describing occupancy may include a hierarchical volumetric grid of some or all positions considered occupied in the HD map. The occupancy grid may include information at a high resolution near the navigable areas, for example, at curbs and bumps, and relatively low resolution in less significant areas, for example, trees and walls beyond a curb. In addition, the fetch-occupancy-grid API may be configured to detect obstacles and to change direction, if necessary.

The 3D map APIs 265 may also include map-update APIs, for example, download-map-updates API and upload-map-updates API. The download-map-updates API may be configured to receive as input a planned route identifier and download map updates for data relevant to all planned routes or for a specific planned route. The upload-map-updates API may be configured to upload data collected by the vehicle computing system 120 to the online HD map system 110. The upload-map-updates API may allow the online HD map system 110 to keep the HD map data stored in the online HD map system 110 up-to-date based on changes in map data that may be observed by sensors of vehicles 150 driving along various routes.

The route API 270 may be configured to return route information including a full route between a source and destination and portions of a route as the corresponding vehicle 150 travels along the route. The 3D map API 265 may be configured to allow querying of the online HD map system 110. The route APIs 270 may include an add-planned-routes API and a get-planned-route API. The add-planned-routes API may be configured to provide information describing planned routes to the online HD map system 110 so that information describing relevant HD maps may be downloaded by the vehicle computing system 120 and kept up to date. The add-planned-routes API may be configured to receive as input, a route specified using polylines expressed in terms of latitudes and longitudes and also a time-to-live (TTL) parameter specifying a time period after which the route data may be deleted. Accordingly, the add-planned-routes API may be configured to allow the vehicle 150 to indicate the route the vehicle 150 is planning on taking in the near future as an autonomous trip. The add-planned-route API may also be configured to align the route to the HD map, record the route and its TTL value, and determine that the HD map data for the route stored in the vehicle computing system 120 is up-to-date. The get-planned-routes API may be configured to return a list of planned routes and to provide information describing a route identified by a route identifier.

The map update API 285 may be configured to manage operations related to updating of map data, both for the local HD map store 275 and for the HD map store 165 stored in the online HD map system 110. Accordingly, modules in the vehicle computing system 120 may be configured to invoke the map update API 285 for downloading data from the online HD map system 110 to the vehicle computing system 120 for storing in the local HD map store 275. The map update API 285 may also be configured to allow the vehicle computing system 120 to determine whether the information monitored by the vehicle sensors 105 indicates a discrepancy in the map information provided by the online HD map system 110 and upload data to the online HD map system 110 that may result in the online HD map system 110 updating the map data stored in the HD map store 165 that is provided to other vehicles 150.

Figure 3:
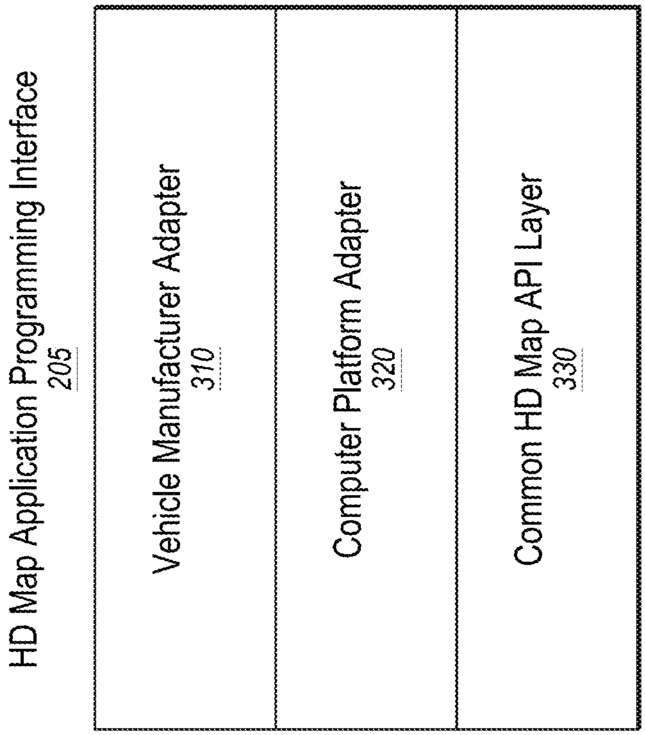
FIG. 3 illustrates an example of various layers of instructions in an HD map application programming interface of a vehicle computing system.

FIG. 3 illustrates an example of various layers of instructions in the HD map API 205 of the vehicle computing system 120. Different manufacturers of vehicles may have different procedures or instructions for receiving information from vehicle sensors 105 and for controlling the vehicle controls 130. Furthermore, different vendors may provide different computer platforms with autonomous driving capabilities, for example, collection and analysis of vehicle sensor data. Examples of a computer platform for autonomous vehicles include platforms provided vendors, such as NVIDIA, QUALCOMM, and INTEL. These platforms may provide functionality for use by autonomous vehicle manufacturers in the manufacture of autonomous vehicles 150. A vehicle manufacturer may use any one or several computer platforms for autonomous vehicles 150.

The online HD map system 110 may be configured to provide a library for processing HD maps based on instructions specific to the manufacturer of the vehicle and instructions specific to a vendor specific platform of the vehicle. The library may provide access to the HD map data and may allow the vehicle 150 to interact with the online HD map system 110.

As illustrated in FIG. 3, the HD map API 205 may be configured to be implemented as a library that includes a vehicle manufacturer adapter 310, a computer platform adapter 320, and a common HD map API layer 330. The common HD map API layer 330 may be configured to include generic instructions that may be used across a plurality of vehicle computer platforms and vehicle manufacturers. The computer platform adapter 320 may be configured to include instructions that may be specific to each computer platform. For example, the common HD map API layer 330 may be configured to invoke the computer platform adapter 320 to receive data from sensors supported by a specific computer platform. The vehicle manufacturer adapter 310 may be configured to include instructions specific to a vehicle manufacturer. For example, the common HD map API layer 330 may be configured to invoke functionality provided by the vehicle manufacturer adapter 310 to send specific control instructions to the vehicle controls 130.

The online HD map system 110 may be configured to store computer platform adapters 320 for a plurality of computer platforms and vehicle manufacturer adapters 310 for a plurality of vehicle manufacturers. The online HD map system 110 may be configured to determine the particular vehicle manufacturer and the particular computer platform for a specific autonomous vehicle 150. The online HD map system 110 may also be configured to select the vehicle manufacturer adapter 310 for the particular vehicle manufacturer and the computer platform adapter 320 the particular computer platform of that specific vehicle 150. In addition, the online HD map system 110 may be configured to send instructions of the selected vehicle manufacturer adapter 310 and the selected computer platform adapter 320 to the vehicle computing system 120 of that specific autonomous vehicle. The vehicle computing system 120 of that specific autonomous vehicle may be configured to install the received vehicle manufacturer adapter 310 and the computer platform adapter 320. The vehicle computing system 120 may also be configured to periodically verify whether the online HD map system 110 has an update to the installed vehicle manufacturer adapter 310 and the computer platform adapter 320. In addition, if a more recent update is available compared to the version installed on the vehicle 150, the vehicle computing system 120 may be configured to request and receive the latest update and to install it.

HD Map System Architecture

FIG. 4 illustrates an example system architecture of the online HD map system 110. The online HD map system 110 may be configured to include a map creation module 410, a map update module 420, a map data encoding module 430, a load balancing module 440, a map accuracy management module 450, a navigable surface module 460, the vehicle interface module 160, and the HD map store 165. Some embodiments of online HD map system 110 may be configured to include more or fewer modules than shown in FIG. 4. Functionality indicated as being performed by a particular module may be implemented by other modules. In some embodiments, the online HD map system 110 may be configured to be a distributed system comprising a plurality of processing systems.

The map creation module 410 may be configured to create HD map data of HD maps from the sensor data collected from several vehicles 150 that are driving along various routes. The map update module 420 may be configured to update previously computed HD map data by receiving more recent information (e.g., sensor data) from vehicles 150 that recently travelled along routes on which map information changed. For example, certain road signs may have changed or lane information may have changed as a result of construction in a region, and the map update module 420 may be configured to update the HD maps and corresponding HD map data accordingly. The map data encoding module 430 may be configured to encode the HD map data to be able to store the data efficiently (e.g., compress the HD map data) as well as send the HD map data to vehicles 150. The load balancing module 440 may be configured to balance loads across vehicles 150 such that requests to receive data from vehicles 150 are distributed across different vehicles 150 in a relatively uniform manner (e.g., the load distribution between different vehicles 150 is within a threshold amount of each other). The map accuracy management module 450 may be configured to maintain relatively high accuracy of the HD map data using various techniques even though the information received from individual vehicles may not have the same degree of accuracy.

Figure 5:
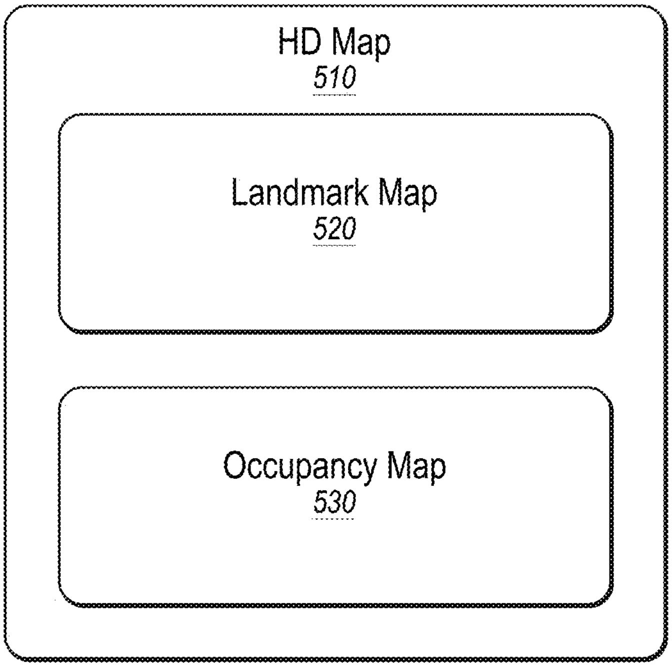
FIG. 5 illustrates example components of an HD map.

FIG. 5 illustrates example components of an HD map 510. The HD map 510 may include HD map data of maps of several geographical regions. In the present disclosure, reference to a map or an HD map, such as HD map 510, may include reference to the map data that corresponds to such map. Further, reference to information of a respective map may also include reference to the map data of that map.

In some embodiments, the HD map 510 of a geographical region may include a landmark map (LMap) 520 and an occupancy map (OMap) 530. The landmark map 520 may comprise information describing lanes including spatial location of lanes and semantic information about each lane. The spatial location of a lane may comprise the geometric location in latitude, longitude, and elevation at high prevision, for example, precision within 30 cm or better. The semantic information of a lane comprises restrictions such as direction, speed, type of lane (for example, a lane for going straight, a left turn lane, a right turn lane, an exit lane, and the like), restriction on crossing to the left, connectivity to other lanes, etc.

In these or other embodiments, the landmark map 520 may comprise information describing stop lines, yield lines, spatial location of cross walks, safely navigable space, spatial location of speed bumps, curb, road signs comprising spatial location, type of all signage that is relevant to driving restrictions, etc. Examples of road signs described in an HD map 510 may include stop signs, traffic lights, speed limits, one-way, do-not-enter, yield (vehicle, pedestrian, animal), etc.

In some embodiments, the occupancy map 530 may comprise a spatial 3-dimensional (3D) representation of the road and physical objects around the road. The data stored in an occupancy map 530 may also be referred to herein as occupancy grid data. The 3D representation may be associated with a confidence score indicative of a likelihood of the object existing at the location. The occupancy map 530 may be represented in a number of other ways. In some embodiments, the occupancy map 530 may be represented as a 3D mesh geometry (collection of triangles) which may cover the surfaces. In some embodiments, the occupancy map 530 may be represented as a collection of 3D points which may cover the surfaces. In some embodiments, the occupancy map 530 may be represented using a 3D volumetric grid of cells at 5-10 cm resolution. Each cell may indicate whether or not a surface exists at that cell, and if the surface exists, a direction along which the surface may be oriented.

The occupancy map 530 may take a large amount of storage space compared to a landmark map 520. For example, data of 1 GB/Mile may be used by an occupancy map 530, resulting in the map of the United States (including 4 million miles of road) occupying $4\times10^{15}$ bytes or 4 petabytes. Therefore, the online HD map system 110 and the vehicle computing system 120 may use data compression techniques to be able to store and transfer map data thereby reducing storage and transmission costs. Accordingly, the techniques disclosed herein may help improve the self-driving of autonomous vehicles by improving the efficiency of data storage and transmission with respect to self-driving operations and capabilities.

In some embodiments, the HD map 510 does may not use or rely on data that may typically be included in maps, such as addresses, road names, ability to geo-code an address, and ability to compute routes between place names or addresses. The vehicle computing system 120 or the online HD map system 110 may access other map systems, for example, GOOGLE MAPS, to obtain this information. Accordingly, a vehicle computing system 120 or the online HD map system 110 may receive navigation instructions from a tool such as GOOGLE MAPS into a route and may convert the information to a route based on the HD map 510 or may convert the information such that it may be compatible for us on the HD map 510.

Geographical Regions in HD Maps

The online HD map system 110 may divide a large physical area into geographical regions and may store a representation of each geographical region. Each geographical region may represent a contiguous area bounded by a geometric shape, for example, a rectangle or square. In some embodiments, the online HD map system 110 may divide a physical area into geographical regions of similar size independent of the amount of data needed to store the representation of each geographical region. In some embodiments, the online HD map system 110 may divide a physical area into geographical regions of different sizes, where the size of each geographical region may be determined based on the amount of information needed for representing the geographical region. For example, a geographical region representing a densely populated area with a large number of streets may represent a smaller physical area compared to a geographical region representing sparsely populated area with very few streets. In some embodiments, the online HD map system 110 may determine the size of a geographical region based on an estimate of an amount of information that may be used to store the various elements of the physical area relevant for the HD map.

In some embodiments, the online HD map system 110 may represent a geographic region using an object or a data record that may include various attributes including: a unique identifier for the geographical region; a unique name for the geographical region; a description of the boundary of the geographical region, for example, using a bounding box of latitude and longitude coordinates; and a collection of landmark features and occupancy grid data.

Figure 6A:
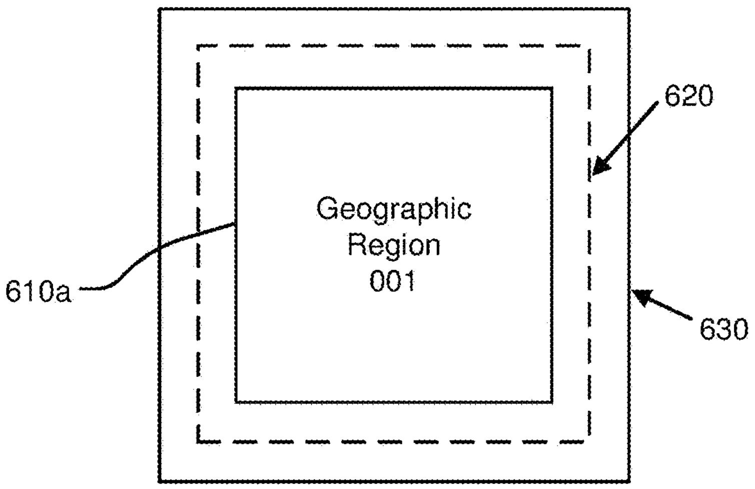
FIGS. 6A-6B illustrate example geographical regions defined in an HD map.
Figure 6B:
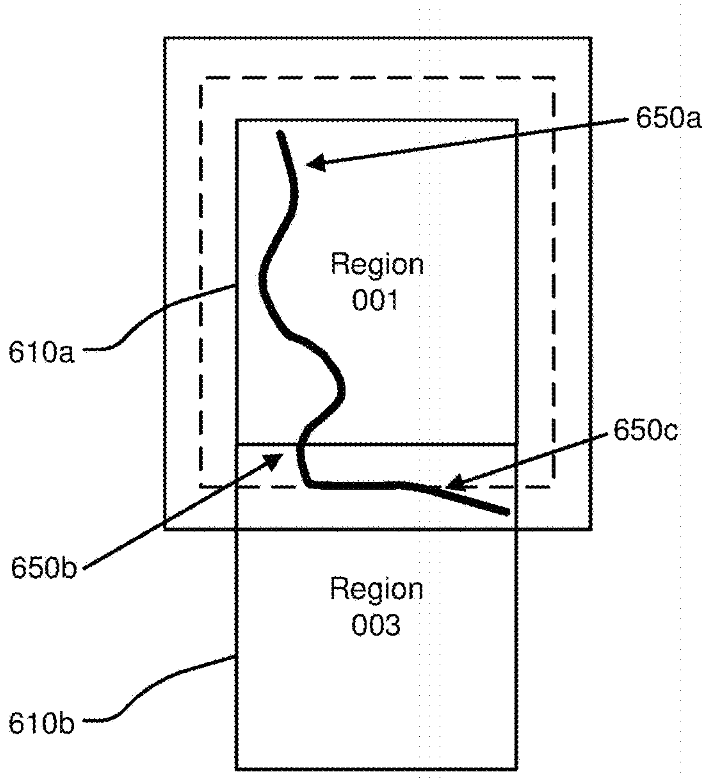

FIGS. 6A-6B illustrate example geographical regions 610*a* and 610*b* that may be defined in an HD map according to one or more embodiments. FIG. 6A illustrates a square geographical region 610*a*. FIG. 6B illustrates two neighboring geographical regions 610*a* and 610*b*. The online HD map system 110 may store data in a representation of a geographical region that may allow for transitions from one geographical region to another as a vehicle 150 drives across geographical region boundaries.

In some embodiments, as illustrated in FIG. 6, each geographic region may include a buffer of a predetermined width around it. The buffer may comprise redundant map data around one or more sides e of a geographic region. In these or other embodiments, the buffer may be around every side of a particular geographic region. Therefore, in some embodiments, where the geographic region may be a certain shape, the geographic region may be bounded by a buffer that may be a larger version of that shape. By way of example, FIG. 6A illustrates a boundary 620 for a buffer of approximately 50 m around the geographic region 610*a* and a boundary 630 for a buffer of approximately 100 m around the geographic region 610*a*.

In some embodiments, the vehicle computing system 120 may switch the current geographical region of the corresponding vehicle 150 from one geographical region to a neighboring geographical region when the corresponding vehicle 150 crosses a predetermined threshold distance within the buffer. For example, as shown in FIG. 6B, the corresponding vehicle 150 may start at location 650*a* in the geographical region 610*a*. The corresponding vehicle 150 may traverse along a route to reach a location 650*b* where it may cross the boundary of the geographical region 610 but may stay within the boundary 620 of the buffer. Accordingly, the vehicle computing system 120 of the corresponding vehicle 150 may continue to use the geographical region 610*a* as the current geographical region of the vehicle. Once the corresponding vehicle 150 crosses the boundary 620 of the buffer at location 650*c*, the vehicle computing system 120 may switch the current geographical region of the corresponding vehicle 150 to geographical region 610*b* from geographical region 610*a*. The use of a buffer may reduce or prevent rapid switching of the current geographical region of a vehicle 150 as a result of the vehicle 150 travelling along a route that may closely track a boundary of a geographical region.

Lane Representations in HD Maps

The HD map system 100 may represent lane information of streets in HD maps. Although the embodiments described may refer to streets, the techniques may be applicable to highways, alleys, avenues, boulevards, paths, etc., on which vehicles 150 may travel. The HD map system 100 may use lanes as a reference frame for purposes of routing and for localization of the vehicle 150. The lanes represented by the HD map system 100 may include lanes that are explicitly marked, for example, white and yellow striped lanes, lanes that may be implicit, for example, on a country road with no lines or curbs but may nevertheless have two directions of travel, and implicit paths that may act as lanes, for example, the path that a turning car may make when entering a lane from another lane.

The HD map system 100 may also store information relative to lanes, for example, landmark features such as road signs and traffic lights relative to the lanes, occupancy grids relative to the lanes for obstacle detection, and navigable spaces relative to the lanes so the vehicle 150 may plan/react in emergencies when the vehicle 150 makes an unplanned move out of the lane. Accordingly, the HD map system 100 may store a representation of a network of lanes to allow the vehicle 150 to plan a legal path between a source and a destination and to add a frame of reference for real-time sensing and control of the vehicle 150. The HD map system 100 stores information and provides APIs that may allow a vehicle 150 to determine the lane that the vehicle 150 is currently in, the precise location of the vehicle 150 relative to the lane geometry, and other relevant features/data relative to the lane and adjoining and connected lanes.

Figure 7:
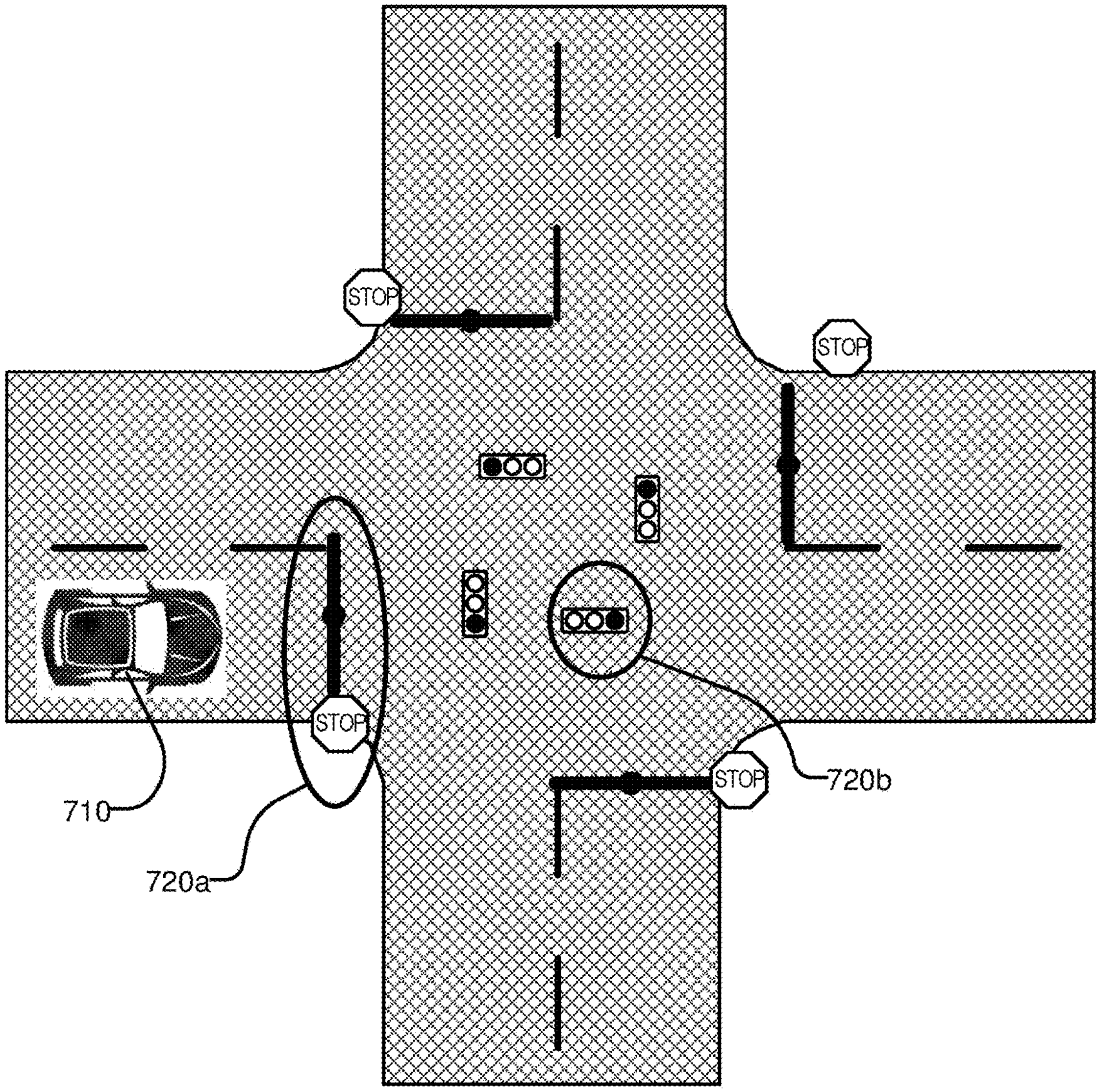
FIG. 7 illustrates example representations of lanes in an HD map.

FIG. 7 illustrates example lane representations in an HD map. FIG. 7 illustrates a vehicle 710 at a traffic intersection. The HD map system 100 provides the vehicle 710 with access to the map data that may be relevant for autonomous driving of the vehicle 710. This may include, for example, features 720*a* and 720*b* that may be associated with the lane but may not be the closest features to the vehicle 710. Therefore, the HD map system 100 may store a lane-centric representation of data that may represent the relationship of the lane to the feature so that the vehicle 710 can efficiently extract the features given a lane.

The HD map data may represent portions of the lanes as lane elements. The lane elements may specify the boundaries of the lane and various constraints including the legal direction in which a vehicle may travel within the lane element, the speed with which the vehicle may drive within the lane element, whether the lane element may be for left turn only, or right turn only, etc. In some embodiments, the HD map data may represent a lane element as a continuous geometric portion of a single vehicle lane. The HD map system 100 may store objects or data structures that may represents lane elements that may comprise information representing geometric boundaries of the lanes; driving direction along the lane; vehicle restriction for driving in the lane, for example, speed limit, relationships with connecting lanes including incoming and outgoing lanes; a termination restriction, for example, whether the lane ends at a stop line, a yield sign, or a speed bump; and relationships with road features that are relevant for autonomous driving, for example, traffic light locations, road sign locations, etc., as part of the HD map data.

Examples of lane elements represented by the HD map data may include, a piece of a right lane on a freeway, a piece of a lane on a road, a left turn lane, the turn from a left turn lane into another lane, a merge lane from an on-ramp an exit lane on an off-ramp, and a driveway. The HD map data may represent a one-lane road using two lane elements, one for each direction. The HD map system 100 may represents median turn lanes that may be shared similar to a one-lane road.

Figure 8A:
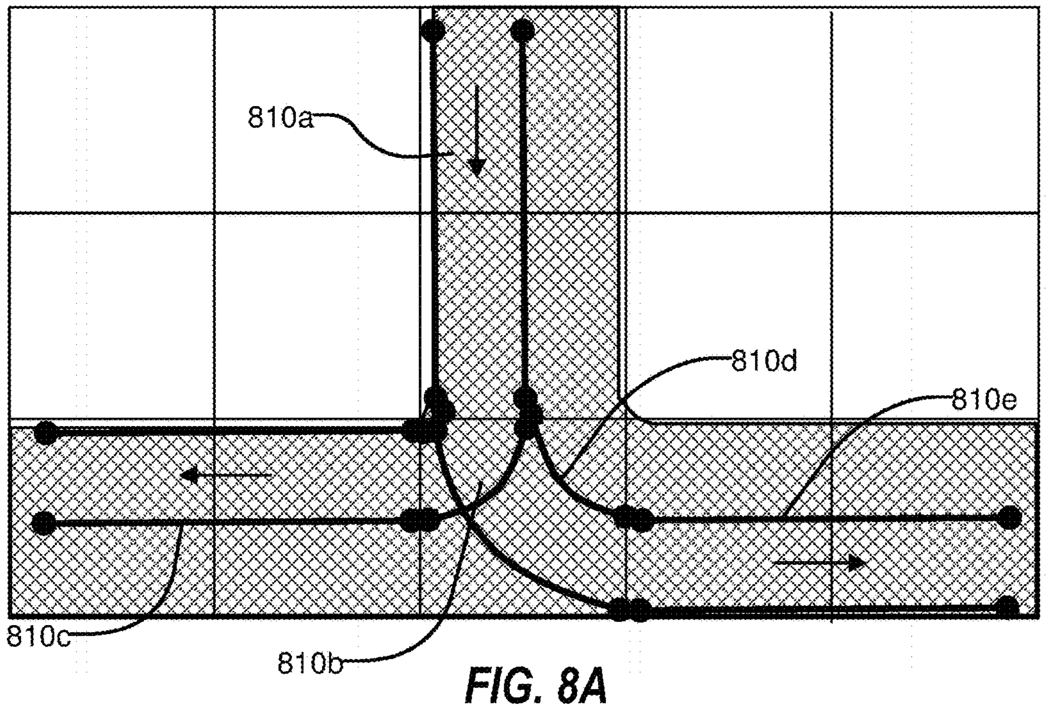
FIGS. 8A-8B illustrates example lane elements and relationships between lane elements in an HD map.
Figure 8B:
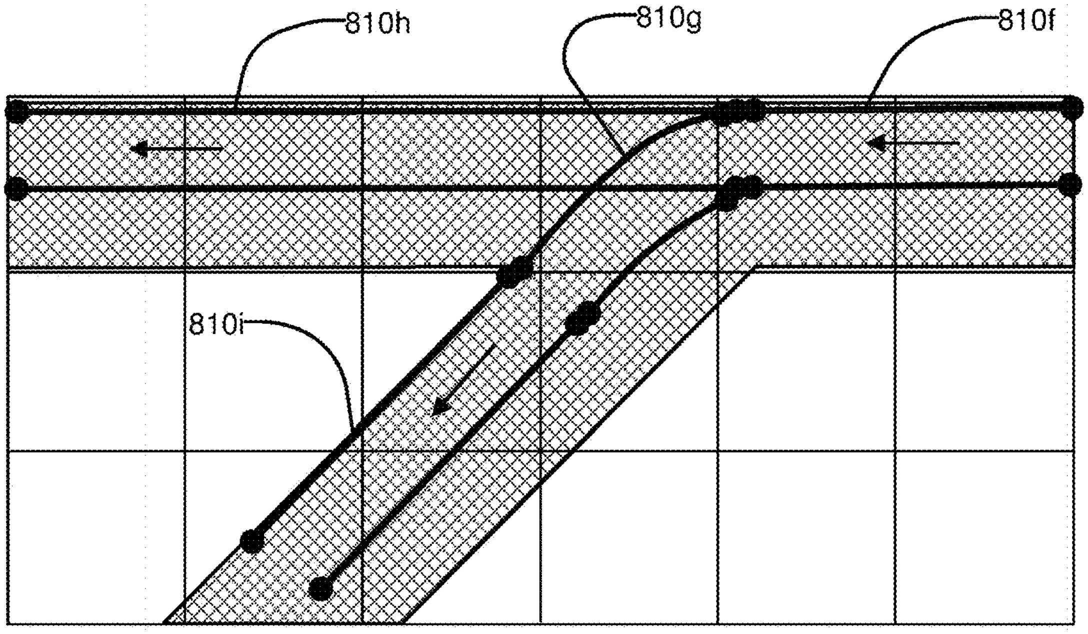

FIGS. 8A-B illustrate lane elements and relations between lane elements in an HD map. FIG. 8A illustrates an example of a T-junction in a road illustrating a lane element 810*a* that may be connected to lane element 810*c* via a turn lane 810*b* and is connected to lane 810*e* via a turn lane 810*d*. FIG. 8B illustrates an example of a Y-junction in a road illustrating label 810*f* connected to lane 810*h* directly and connected to lane 810*i* via lane 810*g*. The HD map system 100 may determine a route from a source location to a destination location as a sequence of connected lane elements that can be traversed to reach from the source location to the destination location.

Semantic Labeling of OMap Point Cloud

In some embodiments, a system may receive sensor data from one or more autonomous vehicles. The system may then generate an HD map comprising a point cloud by combining the received sensor data. The system may also perform segmentation of sensor data received from an autonomous vehicle. The system may perform segmentation by providing the sensor data as input to a deep learning based model. The deep learning based model may be configured to receive an encoding of an input sensor data and output information indicating a type of object represented by a portion of the input sensor data, for example, by a voxel. The system may annotate the point cloud of the high definition map based on the segmentation of the sensor data. The system may send the annotated point cloud to autonomous vehicles. The autonomous vehicles may then perform navigation based on the annotated point cloud. For example, an autonomous vehicle may perform navigation based on the annotated point cloud by sending signals to controls of the autonomous vehicle based on the annotated point cloud. The signals may cause the vehicle to slow down responsive to the annotated point cloud indicating a high likelihood of dynamic objects in a geographical region being approached by the particular autonomous vehicle.

In some embodiments, an autonomous vehicle may perform navigation based on an annotated point cloud by weighing the points of the point cloud of the HD map based on the annotations of the points in an iterative closest point (ICP) process. The ICP process may be used to map sensor data received by an autonomous vehicle to OMap data to perform localization (e.g., to determine the pose of the vehicle in terms of position and orientation). The ICP process may also weight a point indicative of a highly rigid surface (e.g., a wall surface, a ground surface) based on the annotation higher than a point indicative of a less rigid surface (e.g., surfaces on the leaves of a tree).

In some embodiments, the system may identify non-static (e.g., dynamic) objects in a point cloud captured by sensors of the vehicle, for example, by a LIDAR sensor. Examples of dynamic objects may include vehicles (e.g., cars, bicycles, motorcycles, etc.) as well as pedestrians. Dynamic objects may have a high likelihood of changing from one LIDAR scan to another LIDAR scan captured for the same region (or from the same location). Accordingly, a dynamic object may move (e.g., change its position or orientation) from one LIDAR scan to another, even if the two LIDAR scans were captured within a short time interval. Furthermore, a dynamic object may be present in one LIDAR scan but not present in another LIDAR scan, even if the two LIDAR scans were captured by the same vehicle or by different vehicles but within a short time interval, for example, within a few days of each other, within a few hours of each other, or within a few minutes of each other. In contrast, static objects/structures may be objects/structures that are unlikely to change from one LIDAR scan to another. Examples of static objects include buildings, poles, trees, traffic signs, ground, etc. Although static structures may occasionally change over time (e.g., a building may be demolished or a new building built in a place where there was no building before), these changes may be rare and may happen very slowly over very long time intervals, for example, over months or years.

In some embodiments, the online HD map system 110 may receive LIDAR scans from several vehicles that pass through a region. The online HD map system 110 may then combine the information received in the LIDAR scans to generate a point cloud representation of the region (e.g., in an OMap). Given a collection of tracks (which may include GPS-IMU and LIDAR data), the online HD map system 110 may perform global alignment that fuses the GPS-IMU and LIDAR data to compute globally consistent vehicle poses (e.g., location and orientation) for each LIDAR frame. With the global vehicle poses, the online HD map system 110 may merge the LIDAR frames as a consistent, unified point cloud, from which a 3D HD map can be built. The online HD map system 110 may include in the HD map only static objects/structures that are common across several point clouds thereby excluding as many dynamic objects as possible. Accordingly, the point cloud of the HD map may form a ground truth comprising only static objects.

In some embodiments, when a vehicle is driving through a region, the vehicle may receive HD map data for the region from the online HD map system 110. The vehicle may receive the data in advance, for example, by specifying the route that the vehicle plans on travelling before the vehicle drives on the route. Alternatively, the vehicle computing system 120 may download portions of the HD map as the vehicle drives along a route, before the vehicle reaches a region. In some embodiments, the vehicle may be provided with the HD map of a region manually, for example, by attaching a storage device.

In some embodiments, the system may receive sensor data comprising a point cloud, for example, a LIDAR scan obtained by a LIDAR sensor mounted on the vehicle. The system may perform segmentation of the points of the point cloud of the LIDAR scan to obtain one or more clusters of points. The system may classify each cluster based on an object type of the object/structure that the cluster is likely to represent. The system may perform segmentation of the point cloud of the HD map to group points of the HD map into sets of points or segments. The system may perform segmentation by performing a region growing technique that start from one or more points (seed points) featuring specific characteristics and then growing around neighboring points with similar characteristics. The system may perform segmentation using machine learning techniques, such as hierarchical clustering, K-means clustering, or mean shift. In some embodiments, once the system performs segmentation of the point cloud, the system may label each segment (group) of points with a class, thereby associating each segment with some semantic.

In some embodiments, the system may separate ground points from non-ground points and may identify dynamic objects only in segments based on non-ground points. The system may determine ground points by identifying points that are close to the vehicle and immediately in front of the vehicle and fit a plane through those points. The plane may be referred to as a ground plane and may comprises ground points. In some embodiments, the system may determine the ground plane by determining an approximate location of the vehicle, for example using GPS, and then loading an OMap point cloud at that location and identifying the ground plane in that portion of the point cloud. In some embodiments, the system may determine a ground plane by collecting sensor data, for example, a LIDAR scan and identifying a ground plane in the LIDAR scan. The system may have a predetermined estimate of the height of the LIDAR (e.g., based on vehicle manufacturer information). The system may use the height to determine locations of ground points and may fit a plane through these points. The system may determine all points that are not on the ground as non-ground points.

In some embodiments, the system may find correspondences of points of the point cloud obtained from the LIDAR with points of the point cloud of the HD map (e.g., which was obtained by combining data from several LIDAR scans). The correspondences may be determined using a process such as ICP (e.g., based on a determination of nearest neighbor points in two point clouds). The system may identify segments (or clusters or groups or sets of points obtained by segmentation) of the point cloud of the LIDAR scan that have less than a threshold percentage (or fraction) of points having correspondences, for example, segments that have less than 20% of the points with correspondences in the HD map. A point p1 may be determined to have a correspondence if the system is able to find a corresponding point p2 in the HD map point cloud (e.g., point p2 corresponding to point p1) based on ICP. These may be segments that the system was unable to map to corresponding segments in the point cloud. The system may mark each of these identified segments as corresponding to a dynamic (e.g., non-static) object. This determination may be based on the assumption that dynamic objects are not part of the map and therefore the points of these objects do not have correspondences in the map.

In some embodiments, the system may use the determination of the dynamic objects for perception, for example, to make decisions that help with navigation of the object. For example, the system may make a determination that the dynamic objects may move and could come in the path of the vehicle and may navigate through the traffic accordingly. For example, the system may analyze a dynamic object for dynamic movement and may calculate a motion trajectory for the dynamic object to determine whether it is likely to encounter the trajectory of the autonomous vehicle, thereby causing a collision. The system may eliminate these points from the process of localization to determine the pose of the vehicle. Alternatively, the system may assign low weights to points of segments marked as dynamic objects and may assign higher weights to other points during localization. The system may use the pose of the vehicle determined by localization for navigation of the vehicle.

In some embodiments, removal of points corresponding to dynamic objects may make the localization process more efficient since there are fewer points to process. Removal of points corresponding to dynamic objects may also improve accuracy of localization since the dynamic objects should not map to anything in the map and if there is even a fraction of points of the dynamic object that finds correspondences in the map, these points are very likely mapped incorrectly. Therefore, eliminating these entire groups of points corresponding to dynamic objects may result in better mapping of remaining points. Even if an object is incorrectly classified as a dynamic object, the localization accuracy is not significantly affected since there may be several objects/structures that can be mapped to perform localization.

In some embodiments, the system may perform sampling of points of these clusters and finds correspondences of the sampled points. This may make the process efficient since the number of points processed is reduced.

Training Data Generation

In some embodiments, the HD map system may use deep learning based models for performing various tasks, for example, for perception, for recognizing objects in images, for image segmentation, etc. The quality of these models may depend on the amount of training and the quality of training data used to train the models. However, generating good training data for training models used by autonomous vehicles may be difficult since several extreme situations may rarely be encountered by vehicles on the road. Accordingly, the models may never get trained to handle unusual/uncommon situations.

Furthermore, a model trained using images captured under certain conditions may not work with images captured during other conditions. For example, a model trained during a particular season (e.g., a snowy winter) may not work for other seasons (e.g., a sunny summertime). Also, a model trained using images taken at a particular time of the day (e.g., noon) may not work for other times of day (e.g., midnight). For example, the images used for training may be obtained during day time when objects are clearly visible. However, the vehicle may have to travel through the area during nighttime or evening when the images are not very clear. The model may not work well for images taken during evening/nighttime.

Some embodiments of the invention may generate training data using HD map data (e.g., OMap data) for training deep learning based models or machine learning based models used by autonomous vehicles. The system may use sensor data including LIDAR and camera images to build an HD map comprising a point cloud (e.g., an OMap). Various objects and features may be labelled in the HD map. In some embodiments, image recognition techniques may be used to label the features/structures in the HD map. In some embodiments, users/operators may be used to label images which are then projected onto the point cloud of the HD map to label the features in the point cloud.

In some embodiments, the system may project the images onto the point cloud based on the pose of the vehicle. The pose of the vehicle may be determined by the vehicle using localization as the vehicle drives. The system may use the pose (location and orientation) of the vehicle to determine which objects/structures/features are likely to be visible from that location and orientation of the vehicle.

Once the system labels the OMap, the labelled OMap may be used to label subsequent images. For example, a new set of images may be received that may have been captured at a different time. The system may receive the pose of the vehicle that captured each of the new images. The system may identify the objects/structures/features that are likely to be visible from that location/orientation based on the OMap. The system may label the images based on the identified objects/structures/features from the OMap. The labeled images may be used for training various models, for example, models used in perception.

In some embodiments, the system may determine coordinates of bounding boxes around objects that are labeled. For example, if the system identifies a traffic sign, the system may identify coordinates of a bounding box around the traffic sign. The bounding box may be an arbitrary 3D shape, for example, a combination of one or more rectangular blocks. The system may identify the position of the bounding box in an image and may label the object displayed in the image within the projection of the bounding box in the image using the label of the bounding box.

Training Data Generation

Figure 9:
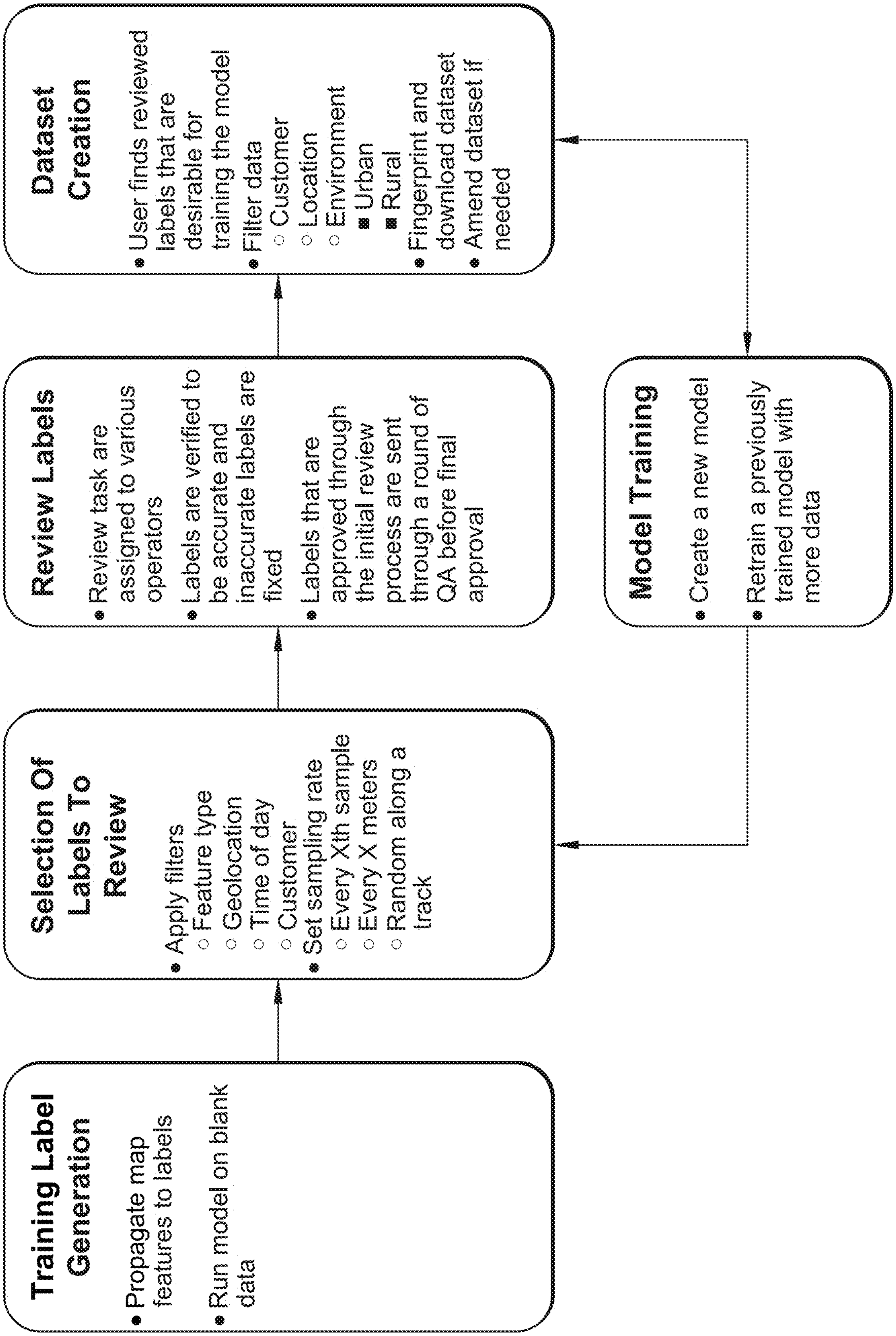
FIG. 9 illustrates a flowchart of an example method for training data generation.

Some embodiments may generate training data for training of models used for building HD maps. FIG. 9 illustrates a flowchart of an example method for training data generation. As disclosed in FIG. 9, the system may perform various steps for training data generation including, for example, training label generation, selection of labels for review, review of labels, dataset creation, and model training.

With respect to quantity, in order to use machine learning techniques, especially deep learning models, the system may need large amounts of labeled samples to learn patterns in the data. To hand-label all of the samples needed may be both tedious and costly. Some embodiments may minimize the cost associated with training label generation so that a user can maximize the benefit of the model. As the system trains the model using larger amounts of high quality training data, the model may improve, which may enable better perception and may expand the capability of automation, which in turn may lower the cost in time and resources to produce a map allowing for the HD maps to be updated more quickly and less expensively.

With respect to quality, the quality of the training labels may have equal importance to the quantity of the training labels. Inaccurate labels may confuse the model and insufficient dataset diversity may lead to a lack of model generalization. High quality training data may involve having varied data and accurate labels. Improving dataset quality or quantity may both be tradeoffs against time so it may be valuable to have a framework which can balance the tradeoff of quality versus quantity for the needs of a project.

With regard to costs, to optimize the cost associated with training label generation, the system may need to reduce the time spent, which may be broken up into multiple aspects. For example, it make take time to generate the labels, review the labels, select the labels from the set of reviewed labels for training a model, and to close the loop (e.g., the time required to generate/review/select new labels if a model is trained and found to be deficient in some aspect). In some embodiments, as the system attempts to minimize all of these aspects, the loop to iterate on models may become smaller and the system's ability to experiment may become greater.

With regard to extensibility, aside from all of the above considerations of dataset quality and quantity, scalability and minimizing the time cost of training data generation, the processes may be flexible enough that additional sources of data (e.g., new sensors such as radar, etc.) or new data processing paradigms (e.g., processing video versus images, streams of LIDAR versus discrete samples, etc.) may be quickly incorporated into the processing framework of the system.

Some embodiments may generate training data using techniques that are scalable and flexible to adaptation. Further, some processes may minimize the cost associated with generating training data to facilitate better models and higher quality automation. The system may generate high quality training data thereby obtaining high quality trained models. Better trained models may result in better perception and automation of vehicles and may make it less expensive and faster to produce HD maps. Furthermore, HD maps may be updated faster and less expensively resulting in better data.

In some embodiments, features may be landmark map features, and may have gone through review during the map building process and may serve as a ground truth. In some embodiments, a label may be an object instance in a sample of data such as, for example, a stop sign in an image or a particular car in a LIDAR sample. In some embodiments, a training sample may be the collection of labels for a particular sample of data such as, for example, all of the car labels for an image or all of the available labels for a LIDAR sample.

Figure 10:
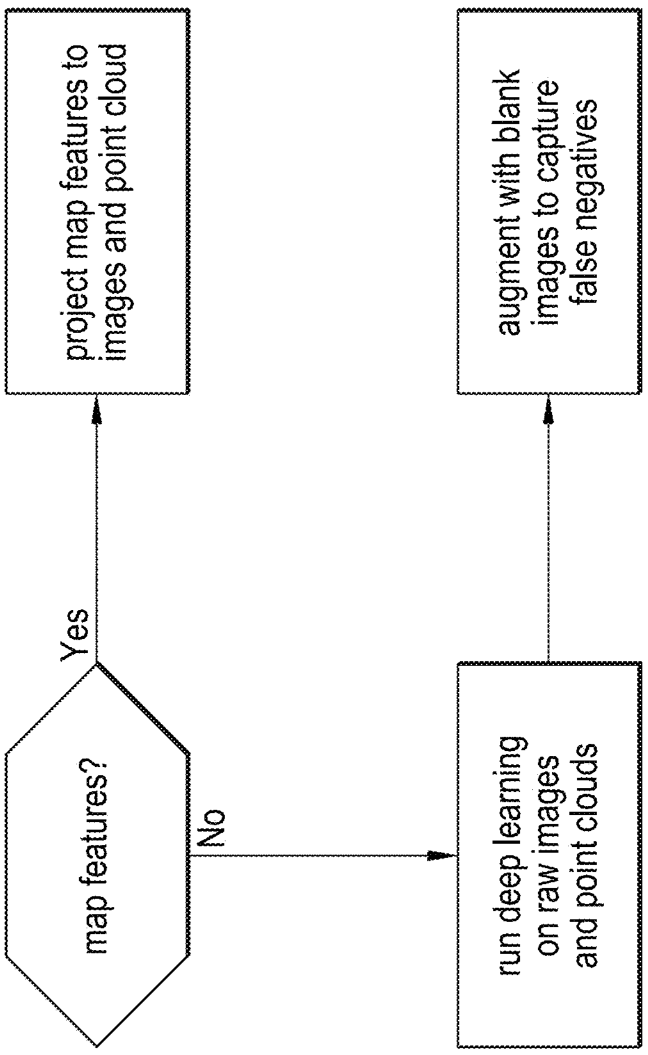
FIG. 10 illustrates a flowchart of an example workflow for training label generation.

FIG. 10 illustrates a flowchart of an example workflow for training label generation. In some embodiments, there may be at least two scenarios to support in training data generation. In the first scenario called the "map features" scenario, the models may be trained on objects that are in the map. Examples of map features may include traffic signs and cars. During the map building process, all instances of these objects may be labeled in the map (and subsequently removed in the case of cars). In the second scenario called the "model output" scenario, the system may directly review the output of the model. Examples of this scenario may include traffic cones, ICP stats, and depth image predictions. Traffic cones may typify an object which may be labeled but which does not make it into the map for labeling. In this scenario, the system may run the model on streams of data to pre-generate labels for review. Eventually, traffic cones may operate in a similar fashion to car removal, but there may always be features that either do not make it into the map or are too infrequent to have enough training data if only produced from map features. ICP stats and depth image predictions may be examples that need the output directly curated to be turned into new training labels. Running the model on data streams (e.g., a collection of images or point clouds) and reviewing the labels may be the most flexible framework and may allow new types of data such as radar to easily fit within the framework. However, the map features scenario may be the preferred framework where available because the system may want to incorporate as much of the work done during the map creation process into the label generation process to avoid duplication of review work. In both the map features scenario and the model output scenario, the goal may be to pre-populate as many labels as possible for review to reduce the work required to review new training labels. FIG. 10 discloses the decision process for which framework to use for pre-populating labels to be reviewed. When map features are available, the reviewed features may be used to project map features to all available samples (e.g., images and point clouds), which may be the preferred workflow to reduce false positives/negatives and to minimize duplication of review. If map features are not available, then the system may directly run the model on the data (e.g., on raw images and point clouds) to populate labels, and the system may augment with blank images to capture false negatives.

Figure 11:
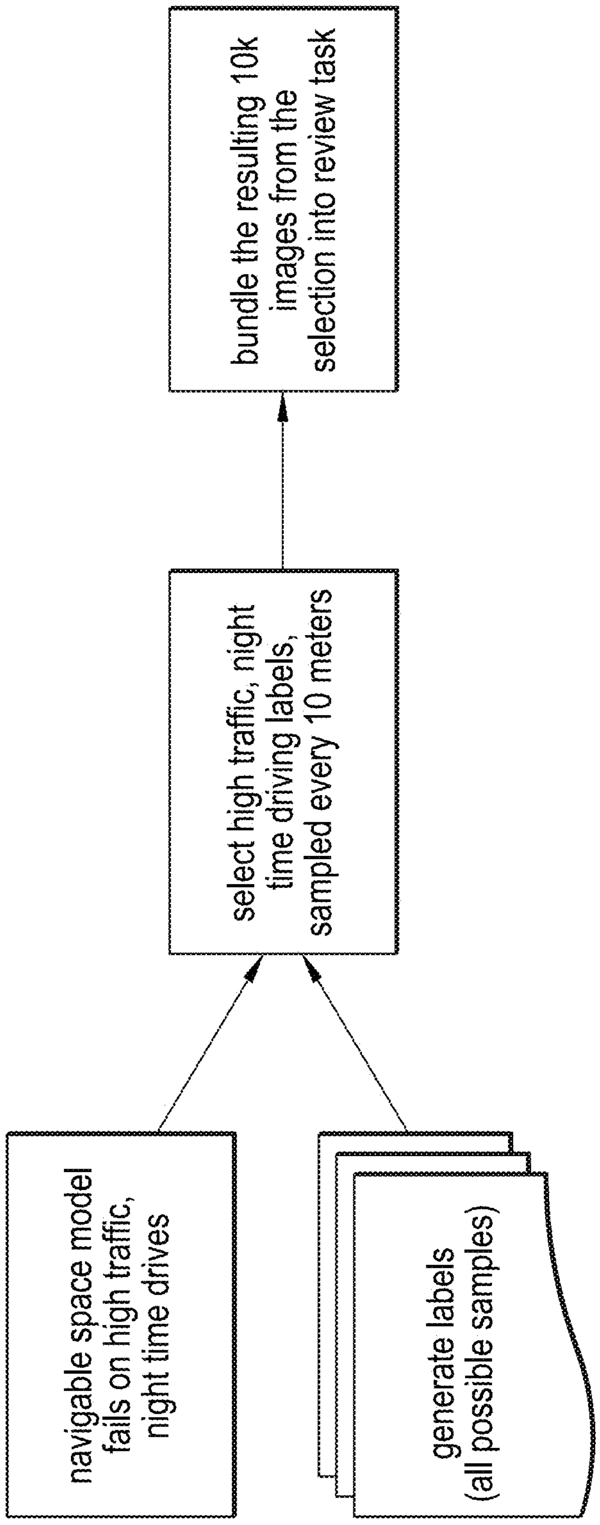
FIG. 11 illustrates a flowchart of an example workflow for selection of labels for review.

FIG. 11 illustrates a flowchart of an example workflow for selection of labels for review. After the population of labels, the process may be unified for both the first and second scenarios. A tool may allow a user to view all of the populated labels and may allow the user to make selections for which labels to send through review. In some embodiments, this may be a manual step. In some embodiments, the system may push all populated labels to review. In some embodiments, the targets for model performance targets may be set, and then the data that is needed to train the model to reach those goals may be selected using the review task creator tool. This tool may take advantage of the metadata tags applied to the training labels to facilitate the selection process. In an example of this workflow, the system may select every 100th low light sample of a particular feature type to create a set of 100 k labels to be reviewed from a set of 10 million generated training labels. FIG. 11 discloses a possible use case for the tool. The user may come to the tool with the knowledge that the user has a model which fails on a particular type of data (e.g., high-traffic night time drives) and generated labels from the pipelines described in the previous section. The user may then manually select the labels that they want for review and, using filters applied to the label metadata, they may be able to quickly select 10 k images to send through review.

Figure 12:
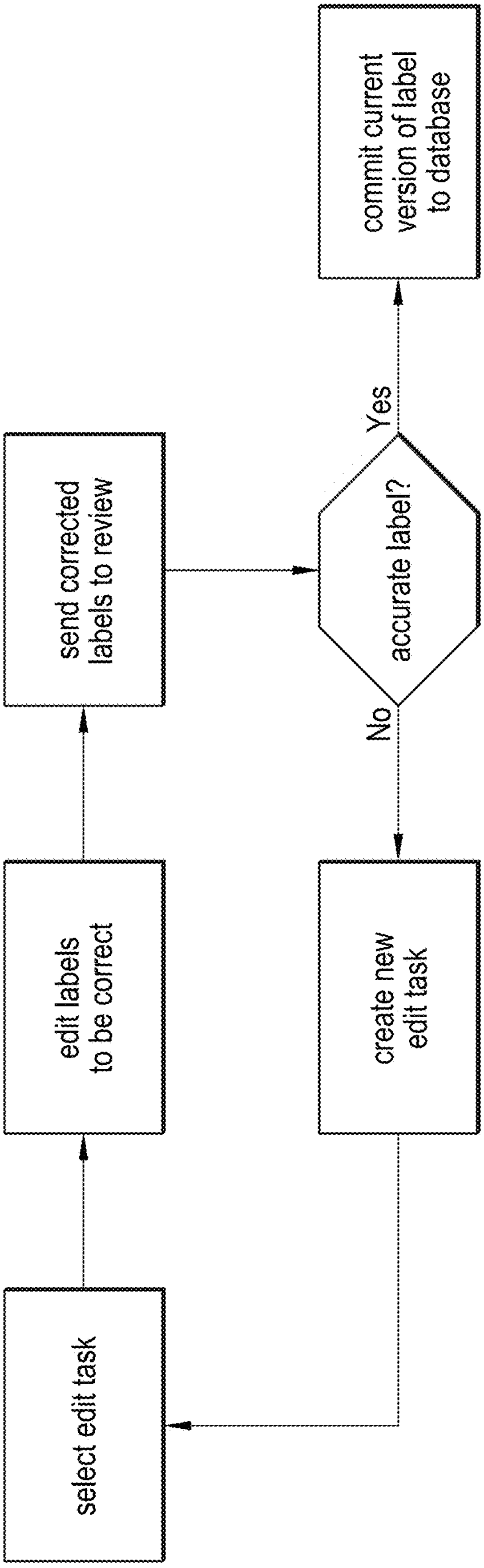
FIG. 12 illustrates a flowchart of an example workflow for review labels.

FIG. 12 illustrates a flowchart of an example workflow for review labels. With the labels to review selected, the samples may be grouped into review tasks by sample size so the quantity of work is consistent across tasks. The review tasks may be divided amongst the available users/operators. After a set of labels have gone through review and corrected for any flaws, the reviewed labels may go through a QA process that approves or rejects each label for correctness. If a label is rejected, it may need to go back through the review process for edits. This process may continue until the label is approved. At this point the label may be committed to the database and versioned in case there are further edits to the same label. FIG. 12 discloses the workflow for reviewing a label. The process may potentially be cyclic as the label goes between editing and QA for approving/rejecting edits.

Figure 13:
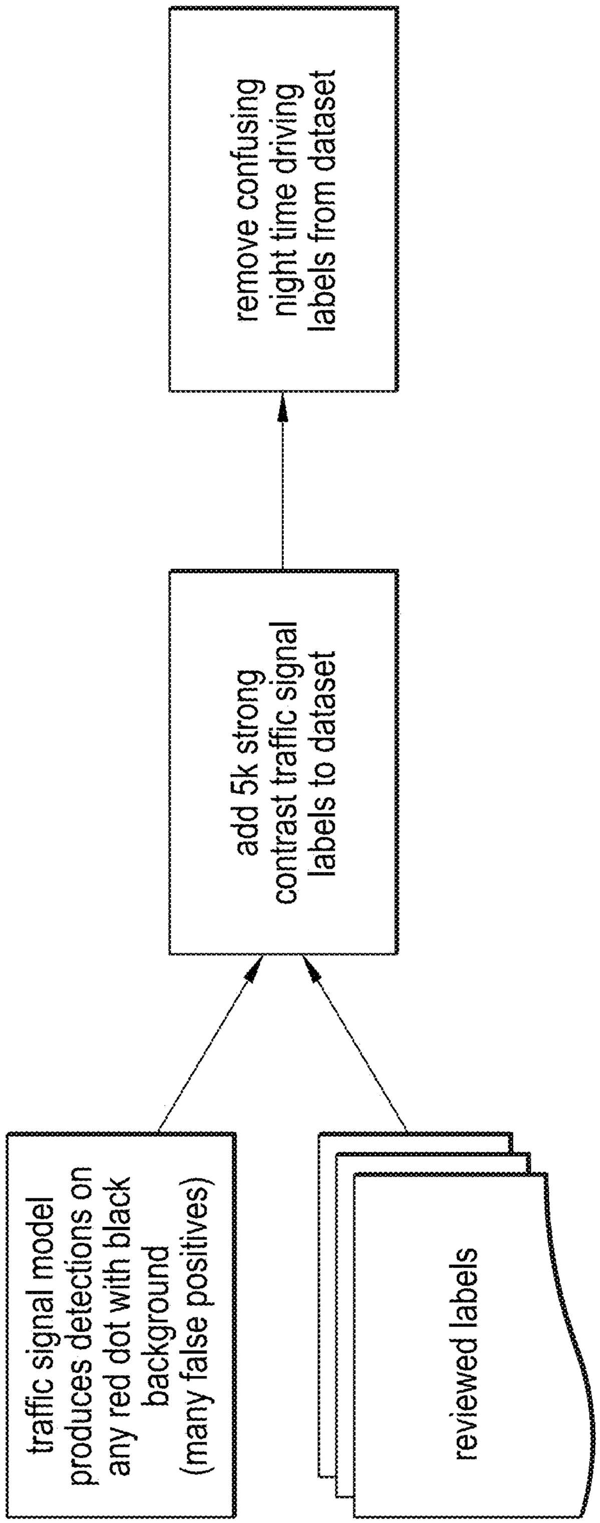
FIG. 13 illustrates a flowchart of an example workflow for dataset creation.

FIG. 13 illustrates a flowchart of an example workflow for dataset creation. After the labels are reviewed, the system may use a tool for browsing reviewed training labels. This tool may be used by the creator of a model and may allow for interaction with the training datasets, from providing visualization of the data and statistical sampling of the data to interactively reporting statistics on the selected dataset. Some potentially reported statistics may include number of instances of each class in the selected training/validation/test dataset, summary statistics of metadata properties such as location, customer, time of day, total number of samples in the dataset, and information about sampling methods used to select the data. Once a user has curated their training dataset they may obtain a fingerprint for the training set and may use this fingerprint to download that exact dataset. FIG. 13 discloses an example use case of this tool. The user may be looking to retrain a model which is performing poorly because it produces too many false positives. The user may want additional data to train the model so they come to this tool to view the reviewed labels. In this tool they may apply some metadata tag filters to narrow down the desired labels to add to 5 k strong contrast traffic signal labels. They may then confirm the addition of those labels to the dataset. Then they may look at the labels already in the dataset they are using and may find the labels of traffic lights during night time driving (e.g., again using filters on metadata tags) and may then confirm that they want to remove these labels from the dataset. They may confirm the final dataset and may get a unique identifier for the dataset.

Figure 14:
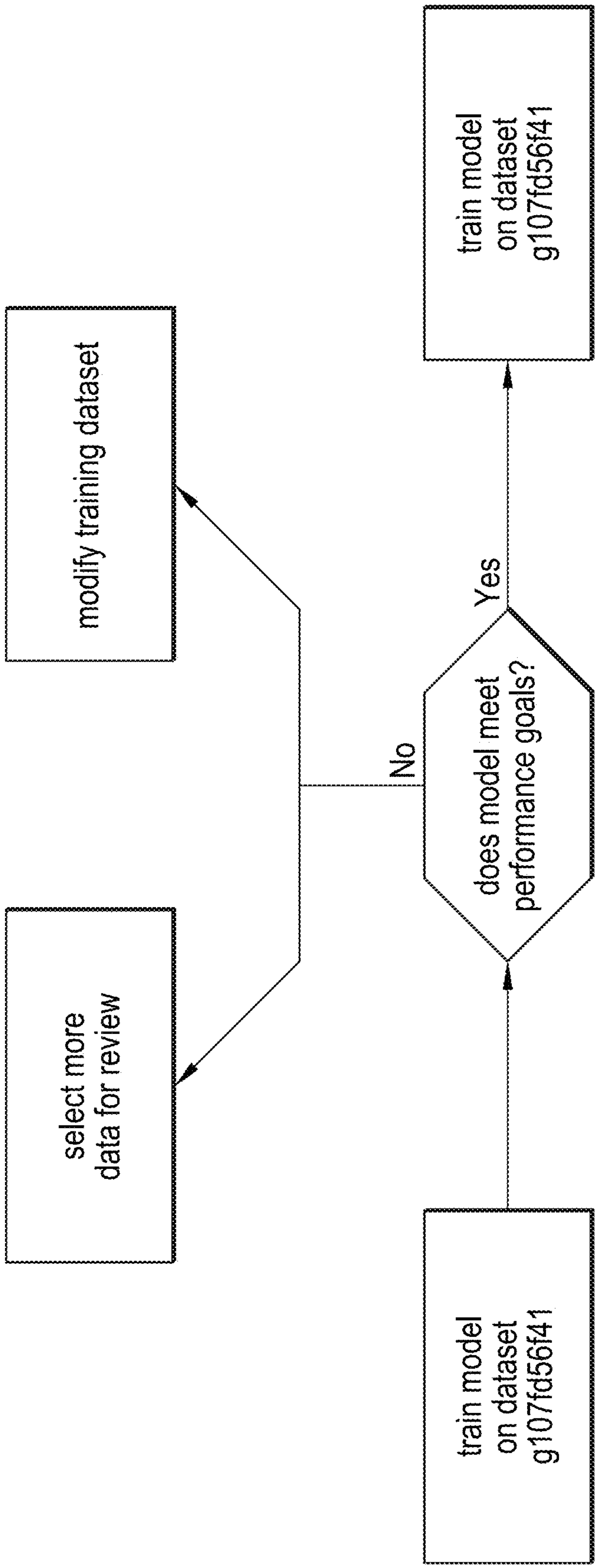
FIG. 14 illustrates a flowchart of an example workflow for model training.

FIG. 14 illustrates a flowchart of an example workflow for model training. After dataset selection, the final step may be to download the data and train the model. Should the training require additional data, the system may repeat the steps above from either dataset selection or from review task creation. FIG. 14 discloses the decision process used by the engineer training a model. They may have a unique identifier for their dataset produced from the dataset creation tool. When they train on this unique identifier, they may be able to stream all of the data that was selected in the dataset creation tool. If the model training is unsuccessful then there may be two paths forward: (1) add/remove data from the dataset using the dataset creation tool, or (2) request for additional data to be labeled and then add it to the dataset using the dataset creation tool. This process may be cyclic as the modified dataset may lead to additional training and repeating of the process until the model is ready to push to production.

With regard to label propagation, when the system creates labels from map features the process may be as follows: (1) generate the map (e.g., review features in the map), (2) from the features in the map (e.g., features refer to all the labeling that occurred during the map building process including car points for car removal), propagate the label to all viable samples. This process may work where the map labels are the best representation (e.g., the sign feature vector representation may be the best form of the feature, better than the model output). This may be true when the sign feature vector is a box and the model output is also a box. However, if the model performs a segmentation of a stop sign but the final map feature is a box then reviewing the model output could save time. The caveat may be that model output may not include false negatives and may include false positives, both of which should be rectified during the map building process. A possible optimization for this case may be to match model output with feature projections so that only samples where a map feature exists is reviewed, but if model output exists at the same location, then use that for label pre-population. For models that do not have map feature labels, the system may need to run the model on all of the data to pre-populate the labels for review. However, it may be optimal to run the model at the last moment possible that does not incur a wait for the data to review because the longer the system waits, the more likely the model has improved and will produce better labels for review. In some embodiments, the system may automate the model building and training process. Every time a set number of training labels have been reviewed from the model's dataset, the system may automatically kick off a new model generation. This may ensure that the model used to produce the labels is the best currently available. However, this may not fix the issue of a poor model running on loads of data before a user reviews any more data to retrain the model. One way to evaluate that issue may be that if there is a poor model in production then more data should be reviewed until the model is adequate. An additional concern when directly reviewing model output may be including false negatives into the dataset to be reviewed. This may require inserting blank data samples into the review tasks. Without a method for pointing out which samples contain the object, the best the system can do is create efficient tools for manually scanning the data. Some embodiments include functionality in a live viewer that allows a user to record sequences of samples so the user could mark the start of a set of samples including the object and mark the end of the observance. Some embodiments support injection of review tasks of blank samples from ranges of track sample id sequences. The same processes for identifying false negative samples may be directly relevant to bootstrapping models which do not yet have sufficient data. A final consideration may be online model training where the model is in the review loop so that every labeled input makes the pre-generated output even better for the next sample to label.

With regard to changing labeling methodology, it may be difficult to foresee all of the training label requirements for training a model, so the system may allow quickly updating the training data. Pixel perfect labels may be ideal but very time consuming. The system may allow labelling rough polygons to approximate an object's shape, bootstrap a model and when the accuracy of the model needs to improve, the system may update the previous labels. The system may allow a user to work quickly to label many training samples when quantity of training data is an issue for example initial model training when there is no previous data. This model may be useful for many months but then new requirements may come in that necessitate a higher accuracy from this model and to improve the accuracy of the model the labels may be revised. In this way, the system may support future accuracy requirements while paying the labeling cost now to only meet the current specifications. The system may support two features: versioning and easily creating review tasks from previously reviewed training data samples. For easily creating review tasks from reviewed samples, if there are 10 k labeled boxes of stop signs, the system may label the 10 k polygons of stop signs by taking the known samples and editing them. With regard to versioning, the system may version all edits to training labels so that the system supports reproducibility of the model training. With regard to dataset differencing, the system may perform dataset differencing to highlight where two or more datasets differ. If there are ten million labels in two different dataset versions, the system may identify the three labels that differ between them and visualizes the appearance of the labels in dataset 1 and what they look like in dataset 2.

With regard to sequential information, sequential data may provide a unique change in training label generation. The system may generally consider each sample as independent which allows for easy distribution of tasks across many machines. With the sequentiality of the data limited to the length of a track, the system may maintain reasonable task distribution across machines during label generation. The system may support linking of label instances across multiple frames. A reviewer may click through a video, highlighting the same instance throughout all of the frames. In some embodiments, a model may pre-populate this information as well, predicting the current instance's segmentation in the next frame.

With regard to scalability, the system may support distributed modes of processing that share the samples to be processed. Training data may be per sample so that it scales with input data (tracks) instead of alignments. Assuming independent samples, all of the data may be processed independently. The system may scale by adding more hardware to achieve target run rates.

In some embodiments, the steps performed for training data generation may include:

1. Pre-populate labels
   - a. Framework 1: training label generation
     - i. Camera image training label
     - ii. Tile image training label
     - iii. Lidar sample training label
   - b. Framework 2: feature labels from model
     - i. Image models
     - ii. Lidar sample models
     - iii. Combined image & lidar models
2. Labelstoreviewselectiontool.
   - This tool may share functionality with the training data selection tool but may be focused on selecting labels to send to review
     - All of the selected labels may be grouped into a project and may be divided into review tasks for QA
3. Traininglabelreviewtool.
   - This tool may support both editing and QA of labels, and during QA tasks only approve/reject actions may be available, but during edit the user can:
     - Add & remove labels
     - Edit labels
     - Change label type
     - Reject image due to data issue of:
       - Blurry
       - Exposure
   - LIDAR sample labels, tile images, and camera image labels may all be reviewed
4. Training data selection tool.
   - This tool may allow for combining feature labels to create the dataset desired for model training. Training samples may be created dynamically which can contain labels of any combination of features, for example signs and cars or cars and navigable space.
     - Labels may be searched by image id so that all labeled features for a given image id can be returned.
   - Labels may be searched by multiple criteria: id, feature type, data conditions, customer, location, etc.
   - The set of <label_id>-<version> strings of all of the samples selected for a dataset may be hashed to uniquely identify the dataset and generate a dataset id. This list of ids may then be stored, keyed by its id, and retrievable from the storage.
5. Model training
   - Datasets may be given a unique identifier so the user can create a repeatable training process. The dataset can be downloaded by its id.

With regard to the structure of a training label, the training label may be stored in a structure that comprises a track identifier, sensor identifier, unique identifier for the training label, image or point cloud label identifier, type of feature that was labeled, a version, and any other metadata.

Deep Learning Model

Figure 15:
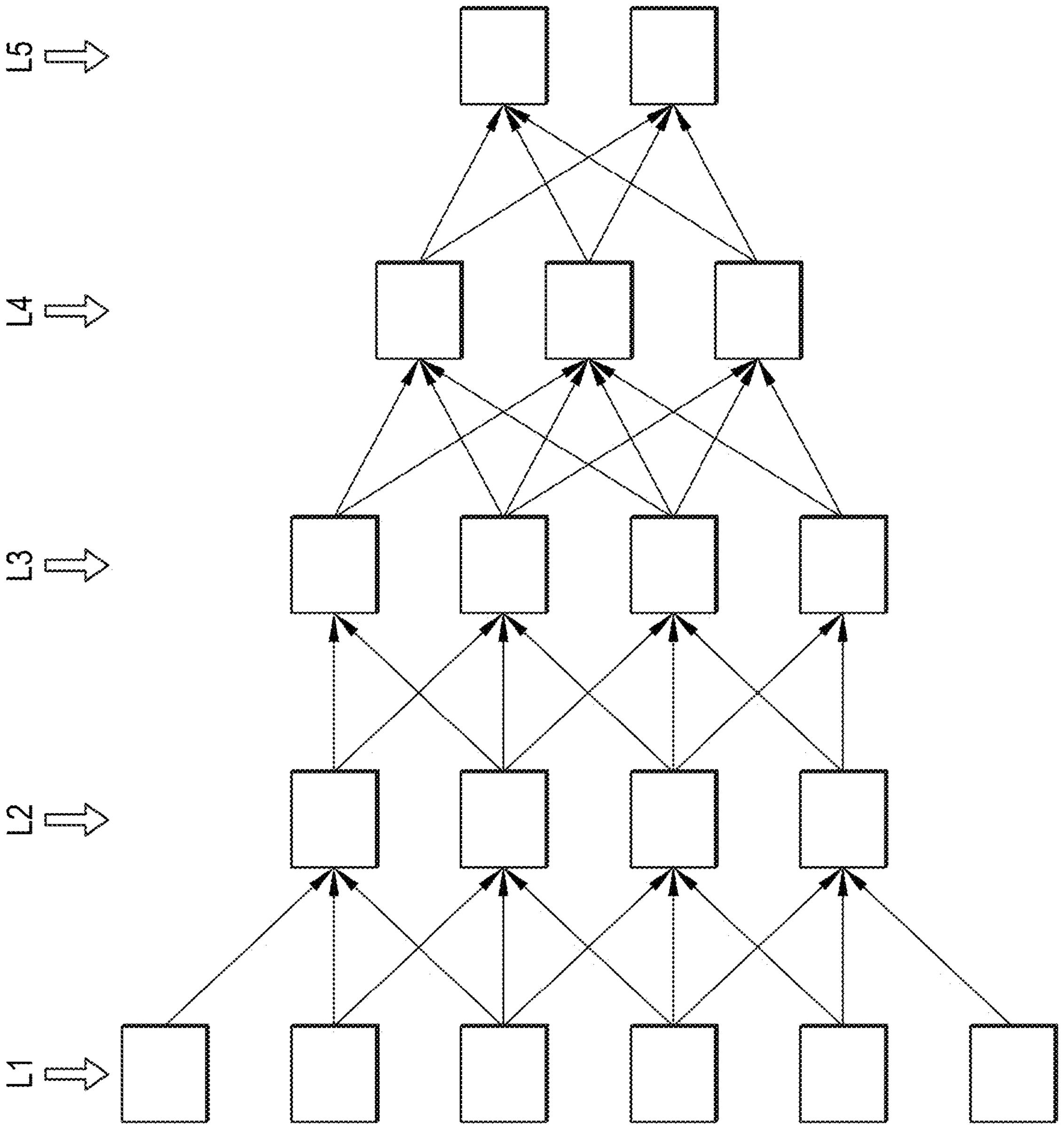
FIG. 15 illustrates an example neural network.

FIG. 15 illustrates an example neural network. In some embodiments, the neural network of FIG. 15 may be used to generate a semantic vector for a received content item. The neural network comprises a plurality of layers (e.g., layers L1 through L5), with each of the layers including one or more nodes. Each node may have an input and an output, and may be associated with a set of instructions corresponding to the computation performed by the node. The set of instructions corresponding to the nodes of the neural network may be executed by one or more computer processors. The neural network may also be referred to as a deep learning neural network, which is one form of a deep learning model.

In some embodiments, each connection between the nodes may be represented by a weight (e.g., a numerical parameter determined in a training/learning process). In some embodiments, the connection between two nodes may be a network characteristic. The weight of the connection may represent the strength of the connection. In some embodiments, a node of one level may only connect to one or more nodes in an adjacent hierarchy grouping level. In some embodiments, network characteristics include the weights of the connection between nodes of the neural network. The network characteristics may be any values or parameters associated with connections of nodes of the neural network.

In some embodiments, the first layer of the neural network (e.g., layer L1) may be referred to as the input layer, while the last layer (e.g., layer L5) may be referred to the output layer. The remaining layers between the input and output layers (e.g., layers L2, L3, L4) may be hidden layers. Accordingly, nodes of the input layer may be input nodes, nodes of the output layer may be output nodes, and nodes of the hidden layers may be hidden nodes. Nodes of each layer may receive input from a previous layer and may provide input to a subsequent layer. For example, nodes of each hidden layer may be associated with two layers (a previous layer and a subsequent layer). The hidden layer may receive the output of the previous layer as input and may provide the output generated by the hidden layer as input to the subsequent layer. For example, nodes of hidden layer L3 may receive input from the previous layer L2 and may provide input to the subsequent layer L4.

In some embodiments, the neural network may be configured to determine semantic features of received content items. The layers of the neural network may be configured to identify features within the received content item. In some embodiments, early layers of the neural network (e.g., layers closer to the input layer) may be convolutional layers configured to perform low level image processing such as edge detection, etc. Later layers of the neural network (e.g., layers closer to the output layer) may be configured to perform higher level processing such as object recognition, etc. In some embodiments, the layers of the neural network may perform recognition of objects in different scales using max pooling between scales, recognitions of objects in different orientations using Gabor filtering, recognition of objects with variances in location using max pooling between neighboring pixels, etc.

In some embodiments, the network characteristics of the neural network (e.g., weights between nodes) may be updated using machine learning techniques. For example, the neural network may be provided with a training set comprising known input content items. The determined semantic features of the content items may be compared to the actual expected semantic features associated with each of the content items, and the comparison may be used to update the network characteristics of the neural network. In some embodiments, the network characteristics of the neural network may be learned by optimizing a loss function using backpropagation.

Figure 16:
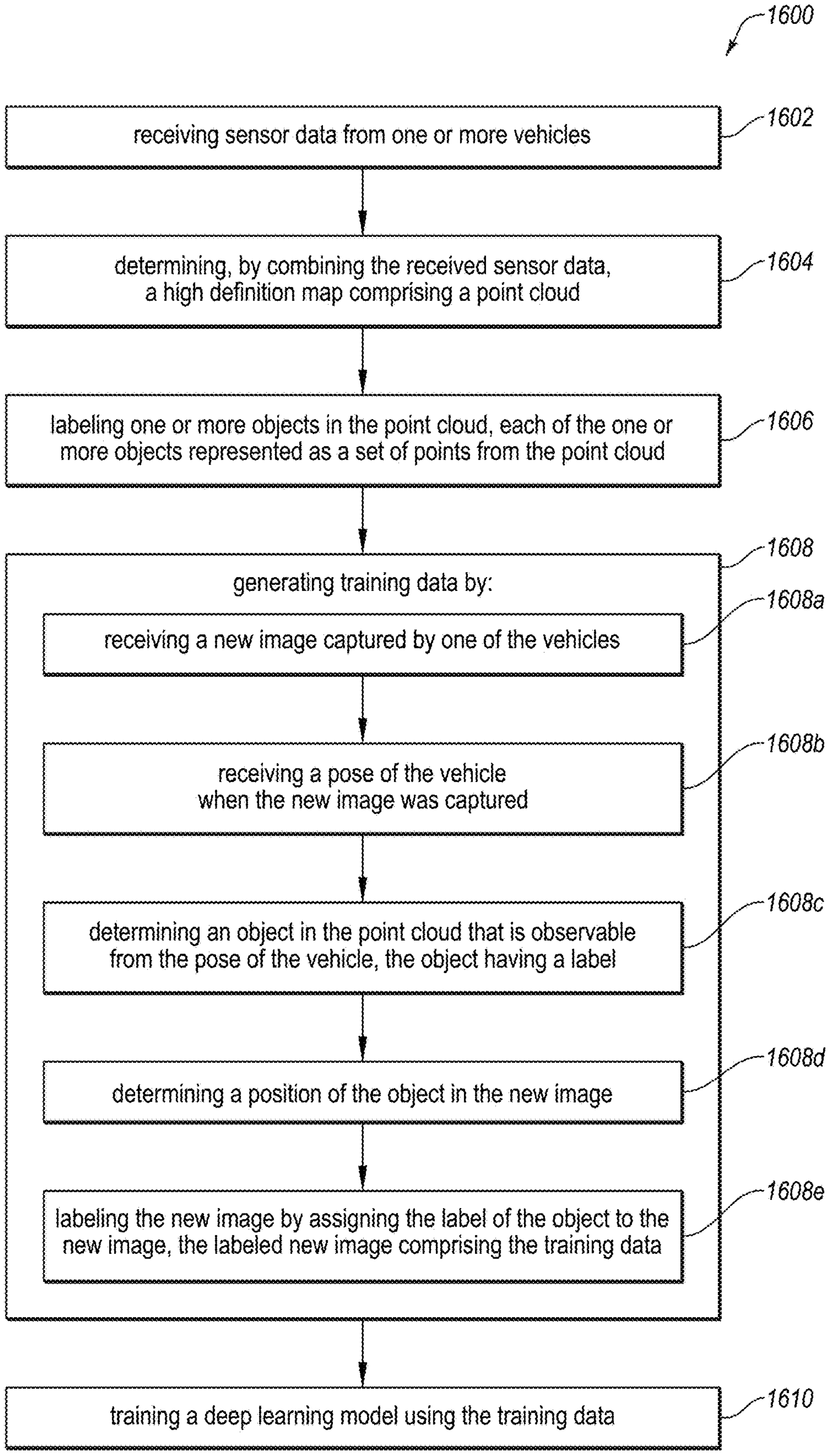
FIG. 16 illustrates a flowchart of an example method for generating training data for training deep learning models used for building high definition maps.

Generating Training Data for Training Deep Learning Models Used for Building HD Maps FIG. 16 illustrates a flowchart of an example method 1600 for generating training data for training deep learning models used for building high definition maps. The method 1600 may be performed by any suitable system, apparatus, or device. For example, one or more elements of the HD map system 100 of FIG. 1 may be configured to perform one or more of the operations of the method 1600. Additionally or alternatively, the computer system 1700 of FIG. 17 may be configured to perform one or more of the operations associated with the method 1600. Although illustrated with discrete blocks, the actions and operations associated with one or more of the blocks of the method 1600 may be divided into additional blocks, combined into fewer blocks, or eliminated, depending on the particular implementation.

The method 1600 may include, at action 1602, receiving sensor data from one or more vehicles. For example, the map update module 420 may receive, at action 1602, sensor data from one or more vehicles.

The method 1600 may include, at action 1604, determining, by combining the received sensor data, a high definition map comprising a point cloud. For example, the map update module 420 may determine, at action 1604, a high definition map comprising a point cloud by combining the received sensor data.

The method 1600 may include, at action 1606, labeling one or more objects in the point cloud, each of the one or more objects represented as a set of points from the point cloud. In some embodiments, the set of points may be identified using a bounding box. In some embodiments, the labeling of the one or more objects may include receiving an image, labeling an object in the image by recognizing the object using a trained deep learning model, identifying the set of points in the point cloud corresponding to the object, and labeling the set of points based on the label of the object. In some embodiments, the labeling of the one or more objects may further comprises generating training labels by propagating map features to labels, selecting labels to review by applying filters to the labels and setting a sampling rate, reviewing labels by verifying accuracy of labels, and creating a dataset by selecting a subset of labels for the training of the deep learning model. For example, the map update module 420 may label, at action 1606, one or more objects in the point cloud, with each of the one or more objects represented as a set of points from the point cloud.

The method 1600 may include, at action 1608, generating training data. For example, the map update module 420 may generate, at action 1608, training data.

The action 1608 may include, at action 1608*a*, receiving a new image captured by one of the vehicles. For example, the map update module 420 may receive, at action 1608*a*, a new image captured by one of the vehicles.

The action 1608 may include, at action 1608*b*, receiving a pose of the vehicle when the new image was captured. For example, the map update module 420 may receive, at action 1608*b*, a pose of the vehicle when the new image was captured.

The action 1608 may include, at action 1608*c*, determining an object in the point cloud that is observable from the pose of the vehicle, the object having a label. For example, the map update module 420 may determine, at action 1608*c*, an object having a label in the point cloud that is observable from the pose of the vehicle.

The action 1608 may include, at action 1608*d*, determining a position of the object in the new image. For example, the map update module 420 may determine, at action 1608*d*, a position of the object in the new image.

The action 1608 may include, at action 1608*e*, labeling the new image by assigning the label of the object to the new image, the labeled new image comprising the training data. For example, the map update module 420 may label, at action 1608*e*, the new image by assigning the label of the object to the new image, with the labeled new image comprising the training data.

The method 1600 may include, at action 1610, training a deep learning model using the training data. For example, the map update module 420 may train, at action 1610, a deep learning model using the training data.

Subsequent to the action 1610, the method 1600 may employ the trained deep learning model to update the HD map, and then employ to HD map in gathering data to further update the HD map store 165, and/or in navigating the vehicle 150. Further, the method 1600 may be employed repeatedly as the vehicle 150 navigates along a road. For example, the method 1600 may be employed when the vehicle 150 (or another non-autonomous vehicle) starts driving, and then may be employed repeatedly during the navigation of the vehicle 150 (or another non-autonomous vehicle). The vehicle 150 may navigate by sending control signals to controls of the vehicle 150. The method 1600 may be employed by the online HD map system 110 and/or by the vehicle computing system 120 of the vehicle 150 to generate training data for a deep learning model, which can then be trained and used to update the HD map to assist, for example, in determining the geographic location of the vehicle 150.

Computer System Architecture

Figure 17:
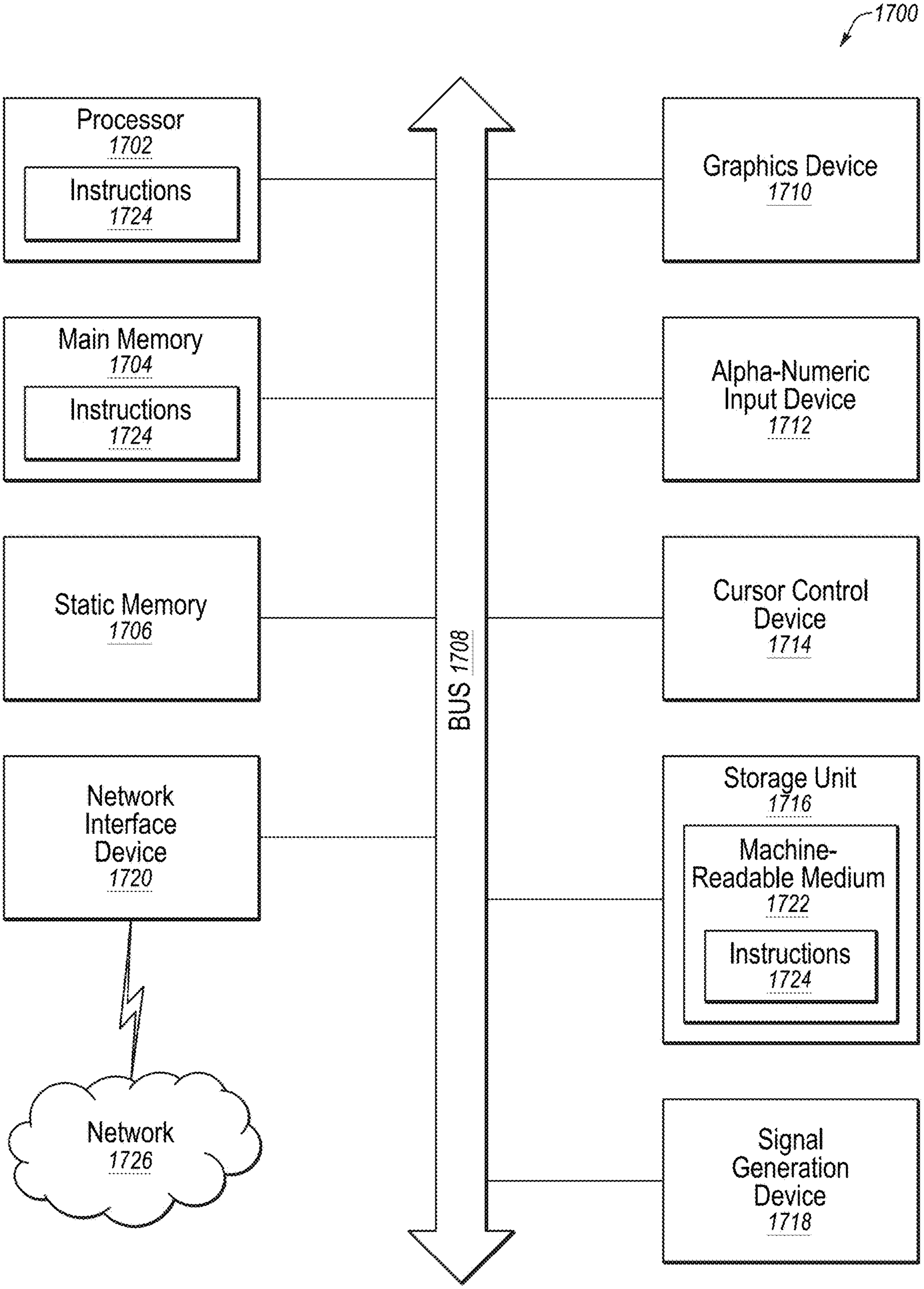
FIG. 17 illustrates an example embodiment of a computing machine that can read instructions from a machine-readable medium and execute the instructions in a processor or controller.

FIG. 17 is a block diagram illustrating components of an example computer system able to read instructions from a machine-readable medium and execute them in a processor (or controller). Specifically, FIG. 17 shows a diagrammatic representation of a machine in the example form of a computer system 1700 within which instructions 1724 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1724 (sequential or otherwise) that specify actions to be taken by that machine. Further, while only a single machine is illustrated, the term "machine" shall also be taken to include any collection of machines that individually or jointly execute instructions 1724 to perform any one or more of the methodologies discussed herein.

The example computer system 1700 may be part of or may be any applicable system described in the present disclosure. For example, the online HD map system 110 and/or the vehicle computing systems 120 described above may comprise the computer system 1700 or one or more portions of the computer system 1700. Further, different implementations of the computer system 1700 may include more or fewer components than those described herein. For example, a particular computer system 1700 may not include one or more of the elements described herein and/or may include one or more elements that are not explicitly discussed.

The example computer system 1700 includes a processor 1702 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1704, and a static memory 1706, which are configured to communicate with each other via a bus 1708. The computer system 1700 may further include graphics display unit 1710 (e.g., a plasma display panel (PDP), a liquid crystal display (LCD), a projector, or a cathode ray tube (CRT)). The computer system 1700 may also include alphanumeric input device 1712 (e.g., a keyboard), a cursor control device 1714 (e.g., a mouse, a trackball, a joystick, a motion sensor, or other pointing instrument), a storage unit 1716, a signal generation device 1718 (e.g., a speaker), and a network interface device 1720, which also are configured to communicate via the bus 1708.

The storage unit 1716 includes a machine-readable medium 1722 on which is stored instructions 1724 (e.g., software) embodying any one or more of the methodologies or functions described herein. The instructions 1724 (e.g., software) may also reside, completely or at least partially, within the main memory 1704 or within the processor 1702 (e.g., within a processor's cache memory) during execution thereof by the computer system 1700, the main memory 1704 and the processor 1702 also constituting machine-readable media. The instructions 1724 (e.g., software) may be transmitted or received over a network 1726 via the network interface device 1720.

While machine-readable medium 1722 is shown in an example embodiment to be a single medium, the term "machine-readable medium" should be taken to include a single medium or multiple media (e.g., a centralized or distributed database, or associated caches and servers) able to store instructions (e.g., instructions 1724). The term "machine-readable medium" shall also be taken to include any medium that is capable of storing instructions (e.g., instructions 1724) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

For example, although the techniques described herein are applied to autonomous vehicles, the techniques can also be applied to other applications, for example, for displaying HD maps for vehicles with drivers, for displaying HD maps on displays of client devices such as mobile phones, laptops, tablets, or any computing device with a display screen. Techniques displayed herein can also be applied for displaying maps for purposes of computer simulation, for example, in computer games, and so on.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc.", or "at least one of A, B, or C, etc." or "one or more of A, B, or C, etc." is used, in general such a construction is intended to include A alone, B alone, C alone, A and B together, A and C together, B and C together, or A, B, and C together, etc. Additionally, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B" even if the term "and/or" is used elsewhere.

All examples and conditional language recited in the present disclosure are intended for pedagogical objects to aid the reader in understanding the present disclosure and the concepts contributed by the inventor to furthering the art and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:

performing one or more operations of a first machine using one or more neural networks, wherein at least one parameter of the one or more neural networks is updated using training data that is generated, at least, by:

assigning a label to an image captured using a camera of a second machine while the second machine is disposed in an environment at a pose, the label corresponding to a feature of the environment that is depicted in the image, the assigning of the label being based at least on:

information corresponding to the feature as obtained from map data corresponding to the environment;

a determination, based at least on the map data and the pose, that the feature is observable by the camera at the pose;

the image being captured while the second machine is disposed at the pose;

an alignment of the image with a map corresponding to the map data; and the label already being applied to the feature in the map data.

2. The method of claim 1, wherein the pose of the second machine is determined based at least on a localization determined based at least on the map data and sensor data captured by the second machine.

3. The method of claim 1, wherein the information corresponding to the feature as included in the map data is based at least on a plurality of other images captured by a plurality of other machines different from the second machine and the first machine.

4. The method of claim 3, wherein the image is captured with respect to one or more different conditions than at least one other image of the plurality of other images.

5. The method of claim 4, wherein the one or more different conditions include one or more of: a time of day, a weather condition, a time of year, or a lighting condition.

6. The method of claim 1, wherein:

the map data includes a point cloud including one or more points corresponding to the feature; and the information corresponding to the feature is associated with the one or more points in the map data.

7. The method of claim 6, wherein the information corresponding to the feature as included in the map data is based at least on one or more respective projections to the point cloud of one or more other images that individually depict the feature.

8. The method of claim 1, wherein the one or more neural networks are trained at least by:

computing an estimated classification corresponding to the feature using at least one neural network of the one or more neural networks;

comparing the estimated classification with the label as assigned to the image and corresponding to the feature; and updating one or more parameters of the at least one neural network based at least on the comparing.

9. The method of claim 1, wherein the one or more neural networks are included in one or more of a deep learning model or a machine learning model.

10. The method of claim 1, wherein the alignment of the image with the map is based at least on the pose as imposed with respect to the map.

11. A system comprising:

one or more processors to cause the system to perform operations comprising:

assigning a label corresponding to a map portion of a map to a feature depicted in an image portion of an image that is aligned with the map portion based at least on;

an alignment, based at least on a pose of a machine, of the image with other sensor data of a different modality; and the feature being previously labeled in the other sensor data with the label;

computing, using a deep learning model, an estimated classification corresponding to the feature as depicted in the image portion;

comparing the estimated classification with the label as projected to the feature as depicted in the image portion; and updating one or more parameters of the deep learning model based at least on the comparing.

12. The system of claim 11, wherein the map includes map data that corresponds to first sensor data obtained using a plurality of machines different from the machine.

13. The system of claim 12, wherein the pose is determined at least by comparing the map data with second sensor data obtained using one or more sensors corresponding to the machine.

14. The system of claim 11, wherein the other sensor data includes a point cloud and the assigning of the label includes:

aligning the image portion with one or more points of the point cloud based at least on the pose of the machine as imposed with respect to the map;

identifying that the one or more points of the point cloud are labeled with the label; and assigning the label to the feature based at least on:

the one or more points of the point cloud being aligned with the image portion;

the feature being depicted in the image portion; and the one or more points being labeled with the label.

15. The system of claim 11, wherein the feature is selected for labeling based at least on a determination that the feature is observable from the pose of the machine at a time of capture of the image.

16. The system of claim 11, wherein the feature includes one or more of:

an object;

a landmark;

a structure;

a road marking; or a road boundary.

17. An autonomous or semi-autonomous machine comprising:

one or more sensors; and one or more processors comprising processing circuitry to cause the autonomous or semi-autonomous machine to perform one or more control operations based at least on one or more outputs of one or more neural networks, wherein at least one parameter of the one or more neural networks is updated using training data that is generated, at least, by:

localizing a vehicle with respect to a map;

capturing, during the localizing, an image;

determining a relative location in the image of a feature identified from the map;

based at least on the relative location, generating a ground truth label corresponding to the relative location in the image of the feature; and storing the image and the ground truth label as an instance of training data.

18. The autonomous or semi-autonomous machine of claim 17, wherein the determining of the relative location in the image of the feature is based at least on an alignment of the image with the map.

19. The autonomous or semi-autonomous machine of claim 18, wherein the alignment of the image with the map is based at least on a pose of a camera used to capture the image as imposed with respect to the map.

20. The autonomous or semi-autonomous machine of claim 17, wherein:

map data corresponding to the map includes a point cloud including one or more points corresponding to the feature;

information about the feature is associated with the one or more points in the map data; and the ground truth label is based at least on the information about the feature as included in the map data.

* * * * *